US 11,358,671 B2

(12) United States Patent
Shibuya

(10) Patent No.: US 11,358,671 B2
(45) Date of Patent: Jun. 14, 2022

(54) LEANING VEHICLE

(71) Applicant: YAMAHA HATSUDOKI KABUSHIKI KAISHA, Iwata (JP)

(72) Inventor: Yu Shibuya, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 78 days.

(21) Appl. No.: 16/564,007

(22) Filed: Sep. 9, 2019

(65) Prior Publication Data

US 2020/0001942 A1 Jan. 2, 2020

Related U.S. Application Data

(63) Continuation of application No. PCT/JP2018/017384, filed on May 1, 2018.

(30) Foreign Application Priority Data

May 19, 2017 (JP) .............................. JP2017-099516

(51) Int. Cl.
*B62K 5/10* (2013.01)
*B62K 5/027* (2013.01)
(Continued)

(52) U.S. Cl.
CPC ................ *B62K 5/10* (2013.01); *B62D 5/04* (2013.01); *B62K 5/027* (2013.01); *B62K 5/05* (2013.01);
(Continued)

(58) Field of Classification Search
CPC . B62K 5/10; B62K 5/027; B62K 5/05; B62K 5/06; B62K 5/08
See application file for complete search history.

(56) References Cited

U.S. PATENT DOCUMENTS 8,831,833 B2 * 9/2014 Hayashi ............... B60G 17/015
701/42
8,997,911 B2 * 4/2015 Hayashi ................. B60G 9/02
180/210
(Continued)

FOREIGN PATENT DOCUMENTS

JP 2015-096373 A 5/2015
JP 2015-127183 A 7/2015
(Continued)

OTHER PUBLICATIONS

Official Communication issued in International Patent Application No. PCT/JP2018/017384, dated Jul. 3, 2018.
(Continued)

*Primary Examiner* — Tony H Winner
*Assistant Examiner* — Michael R Stabley
(74) *Attorney, Agent, or Firm* — Keating and Bennett, LLP

(57) ABSTRACT

A leaning vehicle includes a caliper and an electric motor supported at a same position in a vehicle body frame. Provided that a position opposed to a pad in a plate when a left front wheel is located in an uppermost end in the vehicle-body-frame upward direction in a movable region of the left front wheel and a right front wheel is located in a lowermost end in the vehicle-body-frame downward direction in a movable region of the right front wheel is defined as a left leaning end portion position and a position opposed to the pad in the plate when the left front wheel is located in the lowermost end in the vehicle-body-frame downward direction in the movable region of the left front wheel and the right front wheel is located in the uppermost end in the vehicle-body-frame upward direction in the movable region of the right front wheel is defined as a right leaning end portion position, the electric motor is disposed in a motor disposition region spaced away from a movable region of (Continued)

the plurality of link members by a distance equal to or smaller than a distance between the left leaning end portion position and the right leaning end portion position.

4 Claims, 28 Drawing Sheets

(51) Int. Cl.
    *B62K 5/05*         (2013.01)
    *B62K 5/06*         (2006.01)
    *B62K 5/08*         (2006.01)
    *B62D 5/04*         (2006.01)
    *B62K 11/04*       (2006.01)

(52) U.S. Cl.
    CPC ................ *B62K 5/06* (2013.01); *B62K 5/08* (2013.01); *B62K 11/04* (2013.01)

(56) References Cited

U.S. PATENT DOCUMENTS

| | | | |
|---|---|---|---|
| 9,037,347 B2 * | 5/2015 | Hayashi | B62K 5/10 701/37 |
| 10,086,900 B2 * | 10/2018 | Hara | B62K 5/027 |
| 2005/0012291 A1 * | 1/2005 | Bagnoli | B62K 5/08 280/124.103 |
| 2009/0299565 A1 * | 12/2009 | Hara | B60G 3/14 701/31.4 |
| 2010/0025944 A1 * | 2/2010 | Hara | B62D 9/02 280/5.509 |
| 2016/0375948 A1 * | 12/2016 | Takenaka | B60K 11/00 280/5.506 |
| 2017/0106930 A1 * | 4/2017 | Hara | B62K 5/027 |
| 2017/0106935 A1 | 4/2017 | Hara et al. | |
| 2018/0257731 A1 * | 9/2018 | Kanehara | B60G 21/05 |

FOREIGN PATENT DOCUMENTS

| | | | |
|---|---|---|---|
| JP | 2015127183 A | * | 7/2015 |
| WO | 2009/059099 A2 | | 5/2009 |
| WO | 2015/146679 A1 | | 10/2015 |

OTHER PUBLICATIONS

Piaggio & C.s.p.a, "Spare Parts Catalogue, MP3 300 ie LT—mp3 300 ie LT Sport 2011-2013", NTRC000U01, Jun. 2015, pp. 1-95.

* cited by examiner

Fig.3
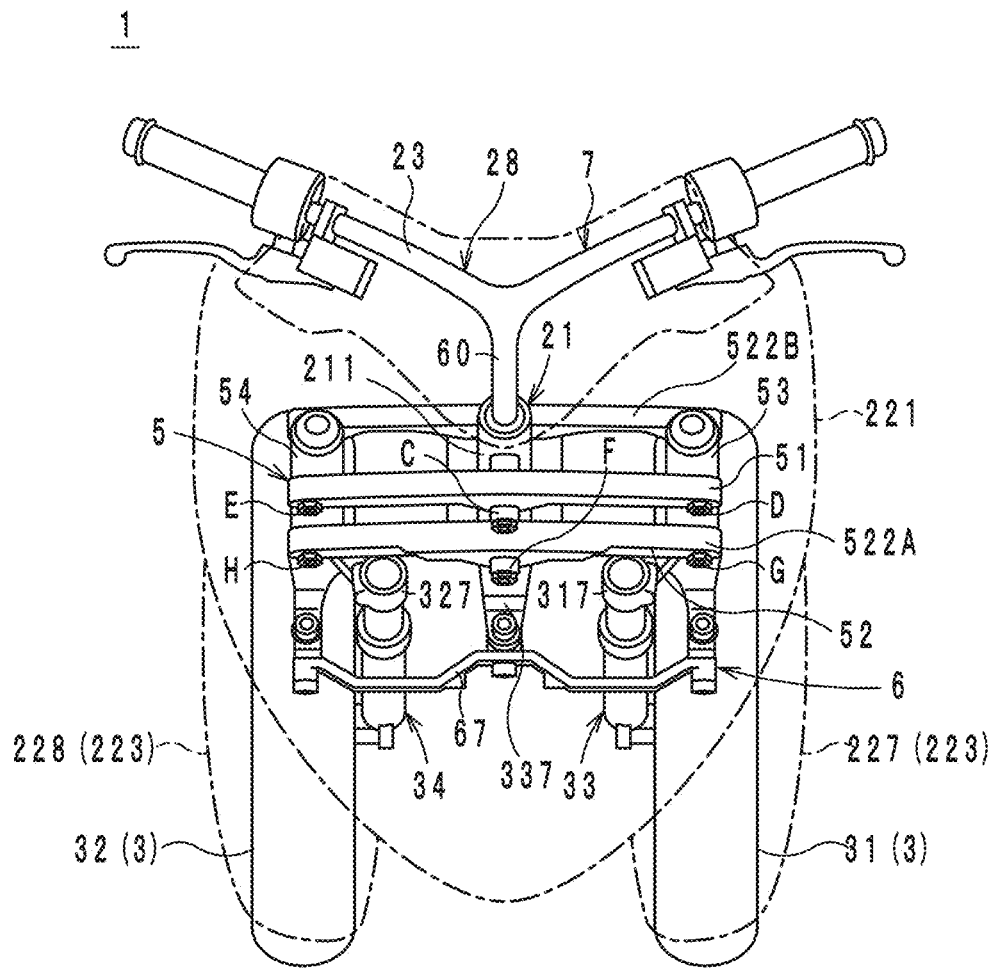
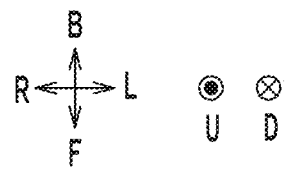
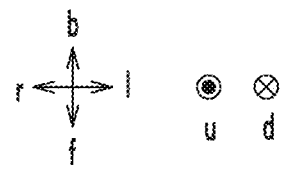

Fig.4
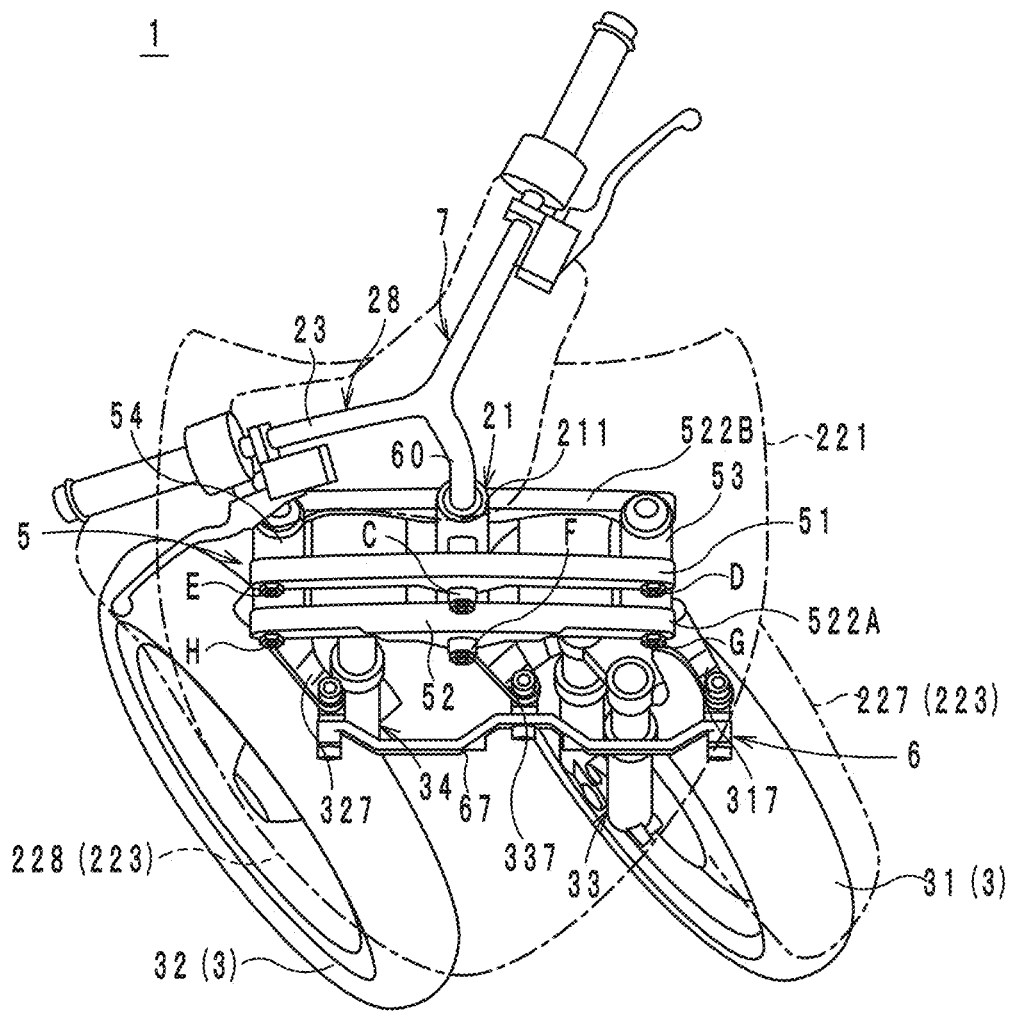
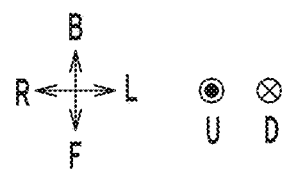
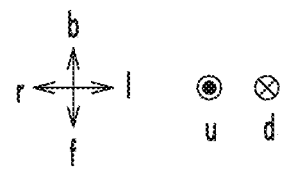

Fig.6
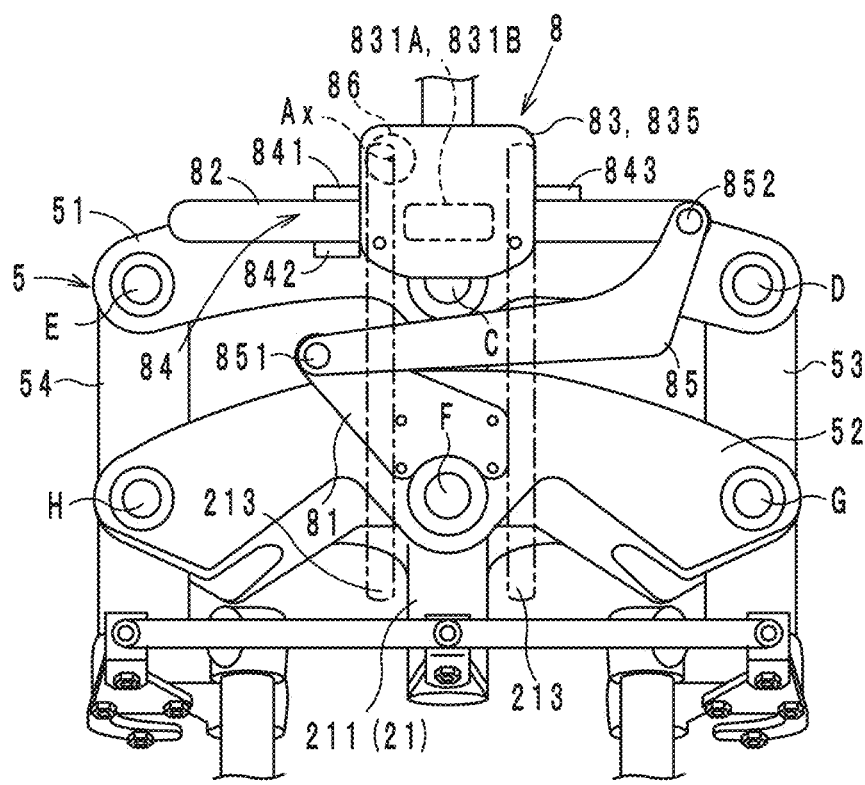
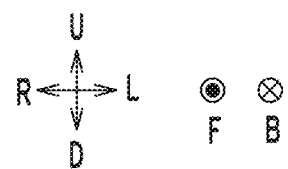
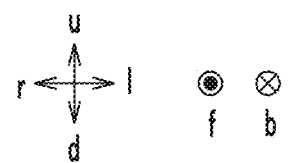

Fig.7
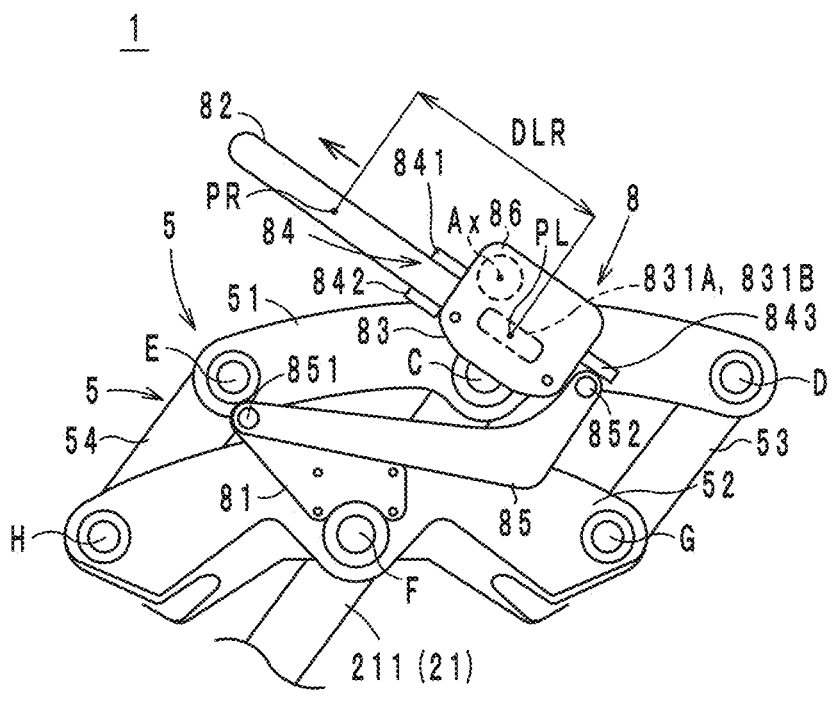
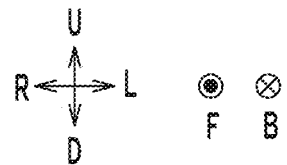
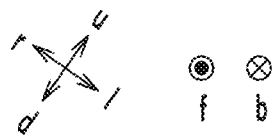

Fig.12
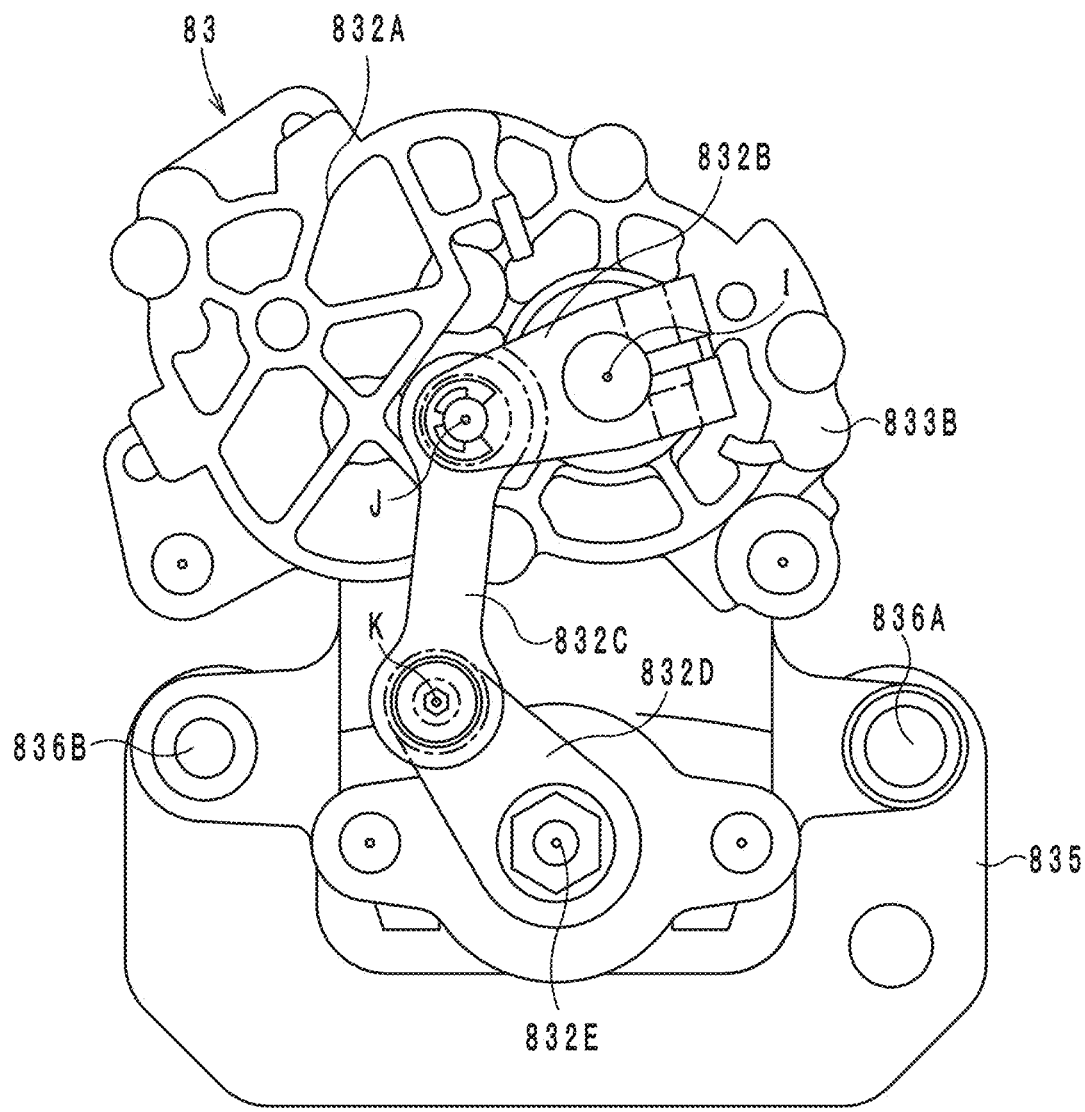
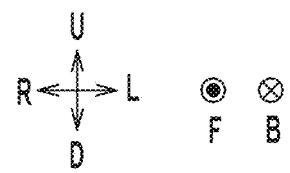
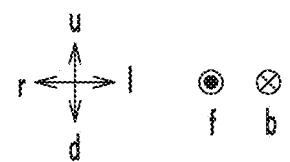

Fig.18
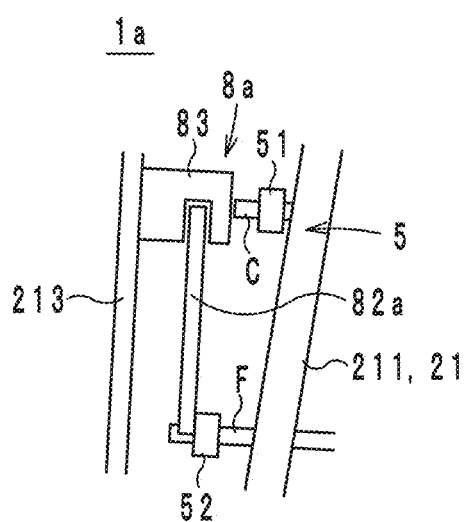
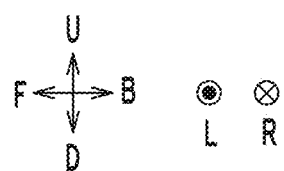
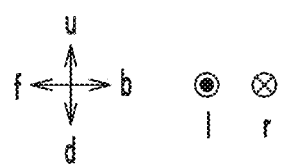

Fig.26
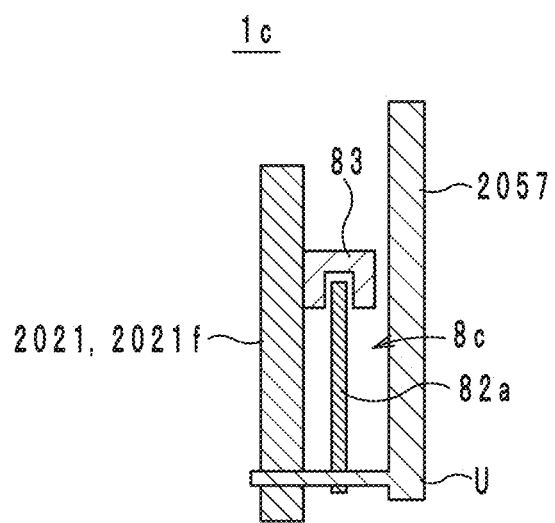
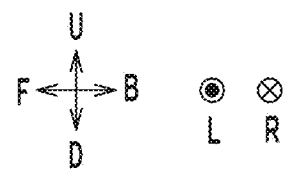
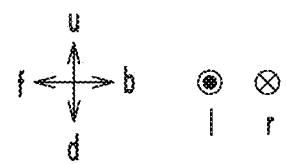

LEANING VEHICLE

CROSS REFERENCE TO RELATED APPLICATIONS

This application claims the benefit of priority to Japanese Patent Application No. 2017-099516 filed on May 19, 2017 and is a Continuation Application of PCT Application No. PCT/JP2018/017384 filed on May 1, 2018. The entire contents of each application are hereby incorporated herein by reference.

BACKGROUND OF THE INVENTION

1. Field of the Invention

The present invention relates to a leaning vehicle including a right steerable wheel and a left steerable wheel.

2. Description of the Related Art

As prior art leaning vehicles, for example, those described in WO 2009/059099 and Catalogo parti di ricambio, MP3 300 ie LT. ZAPM64102, Piaggio & C. S. p. A are known. The leaning vehicles described in WO 2009/059099 and Catalogo parti di ricambio, MP3 300 ie LT. ZAPM64102, Piaggio & C. S. p. A include a vehicle body frame, a right front wheel, and a left front wheel. The right front wheel is disposed to the right of the center of the vehicle body in the vehicle-body-frame left-right direction. The left front wheel is disposed to the left of the center of the vehicle body in the vehicle-body-frame left-right direction. In these leaning vehicles, the vehicle body frame leans in the leaning-vehicle leftward direction during a left turn. The vehicle body frame leans in the leaning-vehicle rightward direction during a right turn.

The leaning vehicle described in WO 2009/059099 includes a link mechanism of a double wishbone type explained below in order to allow the vehicle body frame to lean in the leaning-vehicle left-right direction. The link mechanism includes an upper-left arm member, a lower-left arm member, a left coupling member, an upper-right arm member, a lower-right arm member, a right coupling member, and a buffering mechanism. A right part of the upper-left arm member is supported by the vehicle body frame such that the upper-left arm member can rotate with respect to the vehicle body frame. The lower-left arm member is disposed farther downward in the vehicle-body-frame downward direction than the upper-left arm member. A right part of the lower-left arm member is supported by the vehicle body frame such that the lower-left arm member can rotate with respect to the vehicle body frame. The left coupling member is coupled to a left part of the upper-left arm member and a left part of the lower-left arm member. A left part of the upper-right arm member is supported by the vehicle body frame such that the upper-right arm member can rotate with respect to the vehicle body frame. The lower-right arm member is disposed farther downward in the vehicle-body-frame downward direction than the upper-right arm member. A left part of the lower-right arm member is supported by the vehicle body frame such that the lower-right arm member can rotate with respect to the vehicle body frame. The right coupling member is coupled to the right part of the upper-right arm member and the right part of the lower-right arm member. The buffering mechanism couples the upper-right arm member and the upper-left arm member. The buffering mechanism performs a buffering action.

The upper-right arm member, the lower-right arm member, and the right coupling member can integrally swing in the vehicle-body-frame up-down direction. The upper-left arm member, the lower-left arm member, and the left coupling member can integrally swing in the vehicle-body-frame up-down direction. Consequently, the vehicle body frame can lean in the leaning-vehicle left-right direction.

The leaning vehicle described in Catalogo parti di ricambio, MP3 300 ie LT. ZAPM64102, Piaggio & C. S. p. A includes a link mechanism of a parallelogram link type explained below in order to allow the vehicle body frame to lean in the leaning-vehicle left-right direction. The link mechanism includes an upper cross member, a lower cross member, a left side member, and a right side member. The upper cross member is disposed farther upward in the vehicle-body-frame upward direction than the left front wheel and the right front wheel. The lower cross member is disposed farther downward in the vehicle-body-frame downward direction than the upper cross member and farther upward in the vehicle-body-frame upward direction than the left front wheel and the right front wheel. An upper part of the left side member is supported by a left part of the upper cross member such that the left side member can rotate with respect to the upper cross member. A lower part of the left side member is supported by a left part of the lower cross member such that the left side member can rotate with respect to the lower cross member. An upper part of the right side member is supported by a right part of the upper cross member such that the right side member can rotate with respect to the upper cross member. A lower part of the right side member is supported by a right part of the lower cross member such that the right side member can rotate with respect to the lower cross member. An intermediate part of the upper cross member is supported by the vehicle body frame such that the upper cross member can rotate with respect to the vehicle body frame. An intermediate part of the lower cross member is supported by the vehicle body frame such that the lower cross member can rotate with respect to the vehicle body frame.

In the leaning vehicle explained above, the upper cross member can move in the leaning-vehicle left-right direction with respect to the lower cross member. Consequently, a part where the vehicle body frame supports the intermediate part of the upper cross member moves in the leaning-vehicle left-right direction with respect to a part where the vehicle body frame supports the intermediate part of the lower cross member. As a result, the vehicle body frame can lean in the leaning-vehicle left-right direction.

Incidentally, the leaning vehicles described in WO 2009/059099 and Catalogo parti di ricambio, MP3 300 ie LT. ZAPM64102, Piaggio & C. S. p. A include a lean lock mechanism in order to prevent the vehicle body frame from leaning in the leaning-vehicle left-right direction. In more detail, in the leaning vehicle described in WO 2009/059099, the lean lock mechanism includes a left disk, a right disk, a caliper, and an electric motor. The left disk is fixed to the upper left arm. The right disk is fixed to the upper right arm. The caliper is fixed to the vehicle body frame. The electric motor is mechanically connected to the caliper by a wire. When the electric motor pulls the wires, the caliper holds the left disk and the right disk. The caliper holds the left disk, such that swinging of the upper-left arm member, the lower-left arm member, and the left coupling member with respect to the vehicle body frame stops. The caliper holds the right disk, such that swinging of the upper-right arm member, the lower-right arm member, and the right coupling member with respect to the vehicle body frame stops.

In the leaning vehicle described in Catalogo parti di ricambio, MP3 300 ie LT. ZAPM64102, Piaggio & C. S. p. A, the lean lock mechanism includes a disk, a caliper, an electric motor, and a pump. The disk is fixed to the lower cross member. The caliper is fixed to the vehicle body frame. The pump and the caliper are connected by a hydraulic route. The electric motor operates the pump to generate a hydraulic pressure. The caliper holds the disk by the hydraulic pressure. The caliper holds the disk, such that displacement of the upper cross member, the lower cross member, the left side member, and the right side member with respect to the vehicle body frame stops.

Incidentally, in the leaning vehicles described in WO 2009/059099 and Catalogo parti di ricambio, MP3 300 ie LT. ZAPM64102, Piaggio & C. S. p. A, when the vehicle body frame leans in the leaning-vehicle left-right direction, the link mechanism greatly moves with respect to the vehicle body frame. Since the link mechanism includes the disk, the caliper, and the electric motor, the link mechanism has a large size. The lean lock mechanism having a large size is sometimes desirably not to be disposed near the link mechanism in order to prevent contact of the link mechanism and the lean lock mechanism from occurring. In such a case, a part of the lean lock mechanism is sometimes disposed in a position away from the link mechanism in a front part of the leaning vehicle. A part of the lean lock mechanism is, for example, an electric motor. In the leaning vehicle of WO 2009/059099, the electric motor is disposed farther backward in the vehicle-body-frame backward direction than the link mechanism. In the leaning vehicle of Catalogo parti di ricambio, MP3 300 ie LT. ZAPM64102, Piaggio & C. S. p. A, the electric motor is disposed farther frontward in the vehicle-body-frame frontward direction than the linkage. As a result, in the leaning vehicles described in WO 2009/059099 and Catalogo parti di ricambio, MP3 300 ie LT. ZAPM64102, Piaggio & C. S. p. A, front parts of the leaning vehicles sometimes increase in size.

SUMMARY OF THE INVENTION

Preferred embodiments of the present invention provide leaning vehicles each including a mechanism that prevents a vehicle body frame from leaning in the leaning-vehicle left-right direction, and achieves a reduction in the size of a front portion of the leaning vehicle.

The inventor of preferred embodiments of the present invention examined a method of reducing a front portion of a leaning vehicle in size. In the leaning vehicle of WO 2009/059099, the caliper is disposed in the vehicle-body-frame upward direction of the link mechanism. The electric motor is disposed farther backward in the vehicle-body-frame backward direction than the link mechanism. In this way, the electric motor and the caliper are spaced away from each other. Therefore, a wire that mechanically connects the electric motor and the caliper is long. When the wire is long, friction that occurs between the wire and an outer tube when the electric motor pulls the wire increases. Therefore, a large electric motor is necessary such that the electric motor can pull the wire with a large torque. Such a large electric motor is disposed in a position spaced away from the link mechanism. As a result, in the leaning vehicle of WO 2009/059099, the front part of the leaning vehicle sometimes increases in size.

Therefore, the inventor of preferred embodiments of the present invention examined a method of disposing the electric motor near the linkage. Specifically, the inventor of the present invention examined a method of reducing the electric motor in size. When the electric motor and the caliper are close, the wire that mechanically connects the electric motor and the caliper is short. Consequently, since the friction that occurs between the wire and the outer tube is reduced, a small electric motor that generates a small torque is able to be used in the leaning vehicle. As a result, it is easy to dispose the electric motor near the linkage. It is possible to achieve a reduction in the size of the front portion of the leaning vehicle. As explained above, the inventor of the present invention has realized that a reduction in the size of the front portion of the leaning vehicle is able to be achieved by locating the electric motor and the caliper close to each other.

When the electric motor and the caliper are close, a position where the electric motor is supported by the vehicle body frame and a position where the caliper is supported by the vehicle body frame are easily set to be the same. When the position where the electric motor is supported by the vehicle body frame and the position where the caliper is supported by the vehicle body frame are the same, a structure that supports the electric motor and the caliper with the vehicle body frame is simplified compared with the case in which the position where the electric motor is supported by the vehicle body frame and the position where the caliper is supported by the vehicle body frame are different. The inventor of preferred embodiments of the present invention has realized that, from such a viewpoint as well, it is possible to achieve a reduction in the size of the front portion of the leaning vehicle by locating the electric motor and the caliper close to each other.

Further, when the electric motor and the caliper are close, a probability of the presence of a structure between the electric motor and the caliper decreases. Accordingly, it is less likely to have to complexly bend a transmission path of a driving force from the electric motor to the caliper to avoid the structure present between the electric motor and the caliper. Therefore, the driving force of the electric motor is able to be transmitted to the caliper using a plurality of rigid members such as a plurality of gears or a plurality of arm members without using a wire. Friction less easily occurs in the plurality of rigid members compared with the wire. Less bending easily occurs in the plurality of rigid members compared with the wire. Therefore, a loss of a driving force that occurs in the plurality of rigid members is smaller than a loss of a driving force that occurs in the wire. Consequently, a small electric motor that generates a smaller torque is able to be used in a leaning vehicle. The inventor of preferred embodiments of the present invention has realized that, from such a viewpoint as well, it is possible to achieve a reduction in the size of the front portion of the leaning vehicle by locating the electric motor and the caliper close to each other.

Preferred embodiments of the present invention use the structural configurations explained below in order to solve the problems described above.

According to a preferred embodiment of the present invention, a leaning vehicle includes a vehicle body frame that leans in a leaning-vehicle leftward direction during a left turn and leans in a leaning-vehicle rightward direction during a right turn; a left steerable wheel that is disposed to the left of a center of the vehicle body frame in a vehicle-body-frame left-right direction and that rotates around a left steerable wheel axle; a right steerable wheel that is disposed to the right of the center of the vehicle body frame in the vehicle-body-frame left-right direction and that rotates around a right steerable wheel axle; a linkage that includes a plurality of link members displaceable with respect to the vehicle body frame and supports the left steerable wheel and the right steerable wheel, the linkage causing the vehicle body frame to lean in the leaning-vehicle leftward direction during the left turn by relatively displacing the vehicle body frame and the plurality of link members such that the left steerable wheel axle is located farther upward in a vehicle-body-frame upward direction than the right steerable wheel axle, and the linkage causing the vehicle body frame to lean in the leaning-vehicle rightward direction during the right turn by relatively displacing the vehicle body frame and the plurality of link members such that the right steerable wheel axle is located farther upward in the vehicle-body-frame upward direction than the left steerable wheel axle; and a resistance-force changer including an electric motor, a first frictional-member driver, and a second frictional-member, the first frictional-member driver including a driving-force transmitter and a first frictional member, the driving-force transmitter including one or more rigid members that transmit a driving force generated by the electric motor to a first frictional member, and the resistance-force changer causing the first frictional member and the second frictional member to relatively displace in association with the relative displacement of the vehicle body frame and the plurality of link members, the resistance-force changer operating the electric motor and the driving-force transmitter to change a contact state of the first frictional member and the second frictional member to change a resistance force applied during relative displacement of the vehicle body frame and the plurality of link members; wherein provided that a position where the first frictional member is opposed to the second frictional member when the left steerable wheel is located in an uppermost end in the vehicle-body-frame upward direction in a movable region of the left steerable wheel and the right steerable wheel is located in a lowermost end in a vehicle-body-frame downward direction in a movable region of the right steerable wheel is defined as a left leaning end portion position and a position where the first frictional member is opposed to the second frictional member when the left steerable wheel is located in the lowermost end in the vehicle-body-frame downward direction in the movable region of the left steerable wheel and the right steerable wheel is located in the uppermost end in the vehicle-body-frame upward direction in the movable region of the right steerable wheel is defined as a right leaning end portion position, in the vehicle body frame in an upright state, the entire electric motor is disposed in a motor disposition region spaced away from a movable region of the plurality of link members by a distance equal to or smaller than a distance between the left leaning end portion position and the right leaning end portion position, and the leaning vehicle includes structure of (A) or structure of (B); (A) the first frictional-member driver and the electric motor are supported by the vehicle body frame, and a position where the first frictional-member driver is supported in the vehicle body frame and a position where the electric motor is supported in the vehicle body frame are the same, and (B) the first frictional-member driver and the electric motor are supported by any one of the plurality of link members, and a position where the first frictional-member driver is supported in any one of the plurality of link members and a position where the electric motor is supported in any one of the plurality of link members are the same.

With the leaning vehicle according to the preferred embodiment described above, it is possible to achieve a reduction in the size of a front portion of the leaning vehicle. In more detail, the resistance-force changer includes the first frictional-member driver, the second frictional member, and the electric motor. The first frictional-member driver includes the first frictional member. The resistance-force changer relatively displaces the first frictional member and the second frictional member in association with the relative displacement of the vehicle body frame and the plurality of link members. The resistance-force changer operates the electric motor to change a contact state of the first frictional member and the second frictional member. With such a resistance-force changer, the first frictional member and the second frictional member are disposed near the linkage so as to be able to interlock the operation of the plurality of link members. The first frictional member or the second frictional member relatively moves with respect to the plurality of link members. A moving distance of the first frictional member or the second frictional member with respect to the plurality of link members is, for example, a distance between the left leaning end portion position and the right leaning end portion position. Therefore, when the first frictional member and the second frictional member are disposed near the linkage, the first frictional member or the second frictional member is likely to move into the motor disposition region. The motor disposition region defines a region spaced away from the movable region of the plurality of link members by a distance equal to or smaller than the distance between the left leaning end portion position and the right leaning end portion position. Therefore, in the vehicle body frame in the upright state, the electric motor is disposed in the motor disposition region. Consequently, the distance from the electric motor to the first frictional member decreases. The transmission path of the driving force from the electric motor to the first frictional member also decreases. Accordingly, there is less loss in the driving force transmitted between the electric motor and the first frictional member. As a result, it is possible to use a small electric motor. It is possible to achieve a reduction in the size of the front portion of the leaning vehicle.

The electric motor and the first frictional-member driver are supported by any one of the plurality of link members or the vehicle body frame. In the preferred embodiment of the leaning vehicle described above, since the electric motor and the first frictional member are close to each other, the electric motor and the first frictional-member driver are close to each other. Consequently, a position where the first frictional-member driver is supported by any one of the plurality of link members and a position where the electric motor is supported by any one of the plurality of link members is able to be the same. Similarly, a position where the first frictional-member driver is supported by the vehicle body frame and a position where the electric motor is supported by the vehicle body frame is able to be the same. Accordingly, the structure that supports the first frictional-member driver and the electric motor is simplified. As a result, it is possible to achieve a reduction in the size of the front portion of the leaning vehicle.

When the electric motor and the first frictional-member driver are close, a probability of the presence of structure between the electric motor and the first frictional member decreases. Accordingly, it is less likely to have to complexly bend a transmission path of a driving force from the electric motor to the first frictional member to avoid the structure present between the electric motor and the first frictional member. Therefore, the driving force of the electric motor is transmitted to the first frictional member using a plurality of rigid members without using a wire. Less friction occurs in the plurality of rigid members compared with the wire. Less bending easily occurs in the plurality of rigid members compared with the wire. Therefore, a loss of a driving force that occurs in the plurality of rigid members is smaller than a loss of a driving force that occurs in the wire. Consequently, a small electric motor that generates smaller torque is able to be used in the leaning vehicle. As a result, it is possible to achieve a reduction in the size of the front portion of the leaning vehicle.

According to a preferred embodiment of the present invention, the linkage includes an upper cross member disposed farther upward in the vehicle-body-frame upward direction than the left steerable wheel and the right steerable wheel, and rotatably supported by the vehicle body frame in an intermediate portion of the upper cross member; a lower cross member disposed farther downward in the vehicle-body-frame downward direction than the upper cross member and farther upward in the vehicle-body-frame upward direction than the left steerable wheel and the right steerable wheel, and rotatably supported by the vehicle body frame in an intermediate portion of the lower cross member; a left side member rotatably supported by a left portion of the upper cross member in an upper portion of the left side member and rotatably supported by a left portion of the lower cross member in a lower portion of the left side member; and a right side member rotatably supported by a right portion of the upper cross member in an upper portion of the right side member and rotatably supported by a right side of the lower cross member in a lower portion of the right side member; the left steerable wheel is supported by the left side member; and the right steerable wheel is supported by the right side member.

With the leaning vehicle according to the preferred embodiment described above, in a leaning vehicle including a linkage of a so-called parallelogram link type, it is possible to achieve a reduction in the size of the front portion of the leaning vehicle.

According to a preferred embodiment of the present invention, the vehicle body frame leans in the leaning-vehicle leftward or rightward direction such that the first frictional member is displaced with respect to the second frictional member to define an arcuate track between the left leaning end portion position and the right leaning end portion position when the leaning vehicle is viewed from a front, and a radius of the arcuate track is ¼ or more and ½ or less of a length of the upper cross member in a leaning-vehicle left-right direction.

With the leaning vehicle according to the preferred embodiment described above, a reduction in the size of the front portion of the leaning vehicle is achieved. In more detail, the length of a movable region of a plurality of link members in the leaning-vehicle left-right direction is relatively close to the length of the upper cross member in the leaning-vehicle left-right direction. Therefore, the radius of the arcuate track is set to ½ or less of the length of the upper cross member in the leaning-vehicle left-right direction. Consequently, the length of the movable region of the plurality of link members in the leaning-vehicle left-right direction is equal to or smaller than the length of the arcuate track in the leaning-vehicle left-right direction. As a result, it is easy to prevent the arcuate track from protruding from the movable region of the plurality of link members in the leaning-vehicle left-right direction. Consequently, a reduction in the size of the front portion of the leaning vehicle is achieved.

However, when the radius of the arcuate track decreases, it is desirable to increase a driving force generated by the electric motor in order to generate a sufficient frictional force between the first frictional member and the second frictional member. However, when the driving force of the electric motor is increased, the electric motor is increased in size. Therefore, the radius of the arcuate track is ¼ or more of the length of the upper cross member in the leaning-vehicle left-right direction. Consequently, an increase in the size of the electric motor is prevented. As explained above, a reduction in the size of the front portion of the leaning vehicle is achieved.

According to a preferred embodiment of the present invention, the linkage includes a left arm mechanism including an upper-left arm member rotatably supported by the vehicle body frame in a right portion of the upper-left arm member, a lower-left arm member disposed farther downward in the vehicle-body-frame downward direction than the upper-left arm member and rotatably supported by the vehicle body frame in a right portion of the lower-left arm member, and a left coupling member coupled to a left portion of the upper-left arm member and a left portion of the lower-left arm member, and the left arm mechanism swings in the vehicle-body-frame upward direction when the vehicle body frame leans in the leaning-vehicle leftward direction and swings in the vehicle-body-frame downward direction when the vehicle body frame leans in the leaning-vehicle rightward direction; a right arm mechanism including an upper-right arm member rotatably supported by the vehicle body frame in a left portion of the upper-right arm member, a lower-right arm member disposed farther downward in the vehicle-body-frame downward direction than the upper-right arm member and rotatably supported by the vehicle body frame in a left portion of the lower-right arm member, and a right coupling member coupled to a right portion of the upper-right arm member and a right portion of the lower-right arm member, and the right arm mechanism swings in the vehicle-body-frame upward direction when the vehicle body frame leans in the leaning-vehicle rightward direction and swings in the vehicle-body-frame downward direction when the vehicle body frame leans in the leaning-vehicle leftward direction; and a buffer that couples the left arm mechanism and the right arm mechanism and performs a buffering action; wherein the left steerable wheel is supported by the left coupling member; and the right steerable wheel is supported by the right coupling member.

With the leaning vehicle according to the preferred embodiment described above, in the leaning vehicle including the linkage of a so-called double wishbone type, it is possible to achieve a reduction in the size of the front portion of the leaning vehicle.

The above features, elements, steps, functions, characteristics, aspects, and advantages of the present invention will become clearer from detailed explanation of preferred embodiments of the present invention made in relation to the accompanying drawings.

When used in this specification, a term "and/or" includes one item or every or all combinations of a plurality of related enumerated items.

When used in this specification, use of a term "including", "comprising", or "having", and modifications thereof specify presence of described characteristics, processes, operation, elements, components, and/or equivalents thereof but can include one or a plurality of steps, operations, elements, components, and/or groups thereof.

Unless defined otherwise, all terms (including technical terms and scientific terms) used in this specification have the same meanings as meanings generally understood by those skilled in the art in the field to which the present invention belongs.

Terms such as terms defined in generally used dictionaries should be interpreted as having meanings coinciding with meanings in related techniques and contexts of the present disclosure. Unless explicitly defined in this specification, the terms are not interpreted in ideal or excessively formal meanings.

In the explanation of preferred embodiments of the present invention, it is understood that the numbers of techniques and processes are disclosed. The respective techniques and processes have individual benefits and can be respectively used together with one or more or, in some cases, all of other disclosed techniques. Therefore, for clarity, this explanation abstains from unnecessarily repeating all of possible combinations of respective steps. Nevertheless, the specification and the claims should be read with understanding that all such combinations are within the present invention and the claims.

In the following explanation, for the purpose of explanation, a large number of specific details are explained in order to provide complete understanding of the present invention. However, it is evident for those skilled in the art that the preferred embodiments of the present invention can be carried out without these specific details. The present disclosure should be considered example illustrations of preferred embodiments of the present invention and is not intended to limit the present invention to specific preferred embodiments indicated by the following drawings or explanation.

According to preferred embodiments of the present invention, leaning vehicles each include structure that prevents a vehicle body frame from leaning in a leaning-vehicle left-right direction, and achieve a reduction in the size of a front portion of the leaning vehicle.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a view of the front portion of the leaning vehicle 1 viewed from above "U".

FIG. 4 is a view of the front portion of the leaning vehicle 1 in a left-steered state viewed from above "U".

FIG. 6 is a view of the front portion of the leaning vehicle 1 viewed from the front "F".

FIG. 7 is a view of a resistance-force changer 8, which is viewed from the front "F", in a leaned state toward the left "L" of the vehicle body frame 21.

FIG. 12 is a view of the caliper 83 in an unlocked state viewed from the front "f".

FIG. 18 is a view of the linkage 5 and the resistance-force changer 8a viewed from the left "l" in the vehicle body frame 21 in the upright state.

FIG. 26 is a view of the leaning vehicle 1c viewed from the left "L".

DETAILED DESCRIPTION OF THE PREFERRED EMBODIMENTS

First Preferred Embodiment

Figure 1:
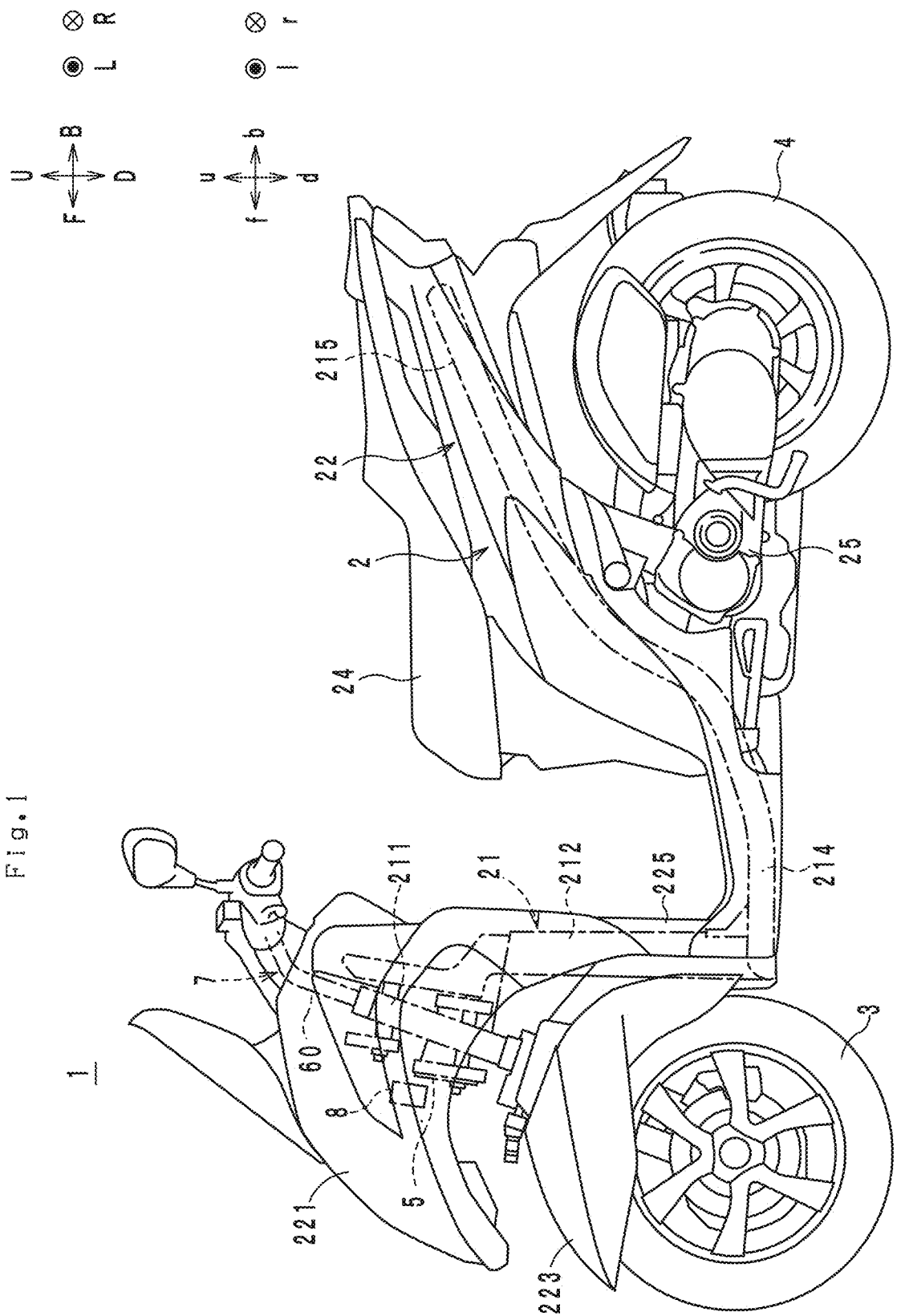
FIG. 1 is a view of a leaning vehicle 1 viewed from the left.

An overall configuration of a leaning vehicle 1 according to a first preferred embodiment of the present invention is explained below with reference to FIG. 1. In this preferred embodiment, a three-wheel leaning vehicle (hereinafter referred to as a leaning vehicle) including a leanable vehicle body frame, two front wheels, and one rear wheel is illustrated as an example of a leaning vehicle. FIG. 1 is a view of the leaning vehicle 1 viewed from the leaning-vehicle (1) left. In the following explanation, the leaning-vehicle (1) frontward direction is referred to as frontward direction "F". The leaning-vehicle (1) backward direction is referred to as backward direction "B". The leaning-vehicle (1) leftward direction is referred to as leftward direction "L". The leaning-vehicle (1) rightward direction is referred to as rightward direction "R". The leaning-vehicle (1) upward direction is referred to as upward direction "U". The leaning-vehicle (1) downward direction is referred to as downward direction "D". The leaning-vehicle (1) front back direction is referred to as front back direction "FB". The leaning-vehicle (1) left-right direction is referred to as left right direction "LR". The leaning-vehicle (1) up-down direction is referred to as up down direction "UD". The leaning-vehicle (1) frontward direction defines a traveling direction of the leaning vehicle 1. The leaning-vehicle (1) backward direction is the opposite direction of the traveling direction of the leaning vehicle 1. The leaning-vehicle (1) leftward direction defines a leftward direction based on a rider straddling the leaning vehicle 1. The leaning-vehicle (1) rightward direction defines a rightward direction based on the rider straddling the leaning vehicle 1. The leaning-vehicle (1) upward direction is an upward direction based on the rider straddling the leaning vehicle 1. The leaning-vehicle (1) downward direction defines a downward direction based on the rider straddling the leaning vehicle 1.

In the leaning vehicle 1, a vehicle body frame 21 leans in leftward direction "L" or rightward direction "R". When the vehicle body frame 21 leans in leftward direction "L" or rightward direction "R", the vehicle-body-frame (21) up-down and left-right directions do not respectively coincide with the leaning-vehicle (1) up-down and left-right directions "UD" and "LR". On the other hand, the vehicle-body-frame (21) up-down and left-right directions in an upright state respectively coincide with the leaning-vehicle (1) up-down and left-right directions "UD" and "LR". In the following explanation, the vehicle-body-frame (21) frontward direction is referred to as frontward direction "f". The vehicle-body-frame (21) backward direction is referred to as backward direction "b". The vehicle-body-frame (21) leftward direction is referred to as leftward direction "l". The vehicle-body-frame (21) rightward direction is referred to as rightward direction "r". The vehicle-body-frame upward direction 21 is referred to as upward direction "u". The vehicle-body-frame downward direction 21 is referred to as "d". The vehicle-body-frame (21) front-back direction is referred to as front back direction "fb". The vehicle-body-frame left-right direction 21 is referred to as left right direction "lr". The vehicle-body-frame (21) up-down direction is referred to as up down direction "ud".

Note that axes and members extending in the front back direction do not always indicate only axes and members parallel to the front back direction. The axes and the members extending in the front back direction mean axes and members leaning in a range of ±45° with respect to the front back direction. Similarly axes and members extending in the up down direction mean axes and members leaning in a range of ±45° with respect to the up down direction. Axes and members extending in the left right direction mean axes and members leaning in a range of ±45° with respect to the left right direction. The upright state of the vehicle body frame 21 means a state in which the front wheel is neither steered nor leaned in a state in which a rider does not ride the leaning vehicle 1 and fuel is not loaded in the leaning vehicle 1.

In this specification, a first member being supported by a second member includes the first member being attached (i.e., fixed) to the second member to be immovable with respect to the second member and the first member being attached to the second member to be movable with respect to the second member. The first member being supported by the second member includes both of the first member being directly attached to the second member and the first member being attached to the second member via a third member.

As shown in FIG. 1, the leaning vehicle 1 includes a leaning-vehicle main body section 2, a pair of left and right front wheels 3, a rear wheel 4, a linkage 5, and a steering mechanism 7. The leaning-vehicle main body section 2 includes a vehicle body frame 21, a vehicle body cover 22, a seat 24, and a power unit 25.

The vehicle body frame 21 leans in the rightward direction "R" during a right turn. The vehicle body frame 21 leans in the leftward direction "L" during a left turn. The vehicle body frame 21 includes a head pipe 211, a down frame 212, an under frame 214, and a rear frame 215. In FIG. 1, in the vehicle body frame 21, a portion hidden by the vehicle body cover 22 is indicated by a broken line. The vehicle body frame 21 supports the seat 24, the power unit 25, and the like. The power unit 25 includes a driving source such as an engine or an electric motor and a transmission device.

The head pipe 211 is disposed in a front portion of the leaning vehicle 1. The front portion of the leaning vehicle 1 defines a portion located farther in the frontward direction "F" than the front end of the seat 24 in the leaning vehicle 1. A rear portion of the leaning vehicle 1 defines a portion located farther in the backward direction "B" than the front end of the seat 24 in the leaning vehicle 1. The head pipe 211 leans with respect to the up down direction "ud" such that the upper end portion of the head pipe 211 is located farther in the backward direction "b" than the lower end portion of the head pipe 211 when the vehicle body frame 21 is viewed from the right "r" or left "l". The steering mechanism 7 and the linkage 5 are disposed around the head pipe 211. A steering shaft 60 of the steering mechanism 7 is rotatably inserted into the head pipe 211. The linkage 5 is supported by the head pipe 211.

The down frame 212 is disposed farther in the backward direction "b" than the head pipe 211. The down frame 212 preferably has a cylindrical shape extending in the up down direction "ud". The upper end portion of the down frame 212 is located behind "b" the lower end portion of the head pipe 211. The upper end portion of the down frame 212 is fixed to the lower end portion of the head pipe 211 by a not-shown connecting section.

The under frame 214 extends in the backward direction "b" and the upward direction "u" from the lower end portion of the down frame 212. The rear frame 215 extends in the backward direction "b" and the upward direction "u" from the rear end of the under frame 214.

The vehicle body frame 21 is covered by the vehicle body cover 22. The vehicle body cover 22 includes a front cover 221, a pair of left and right front fenders 223, and a leg shield 225. The front cover 221 is located in front "f" of the seat 24. The front cover 221 covers at least portions of the steering mechanism 7 and the linkage 5.

Figure 2:
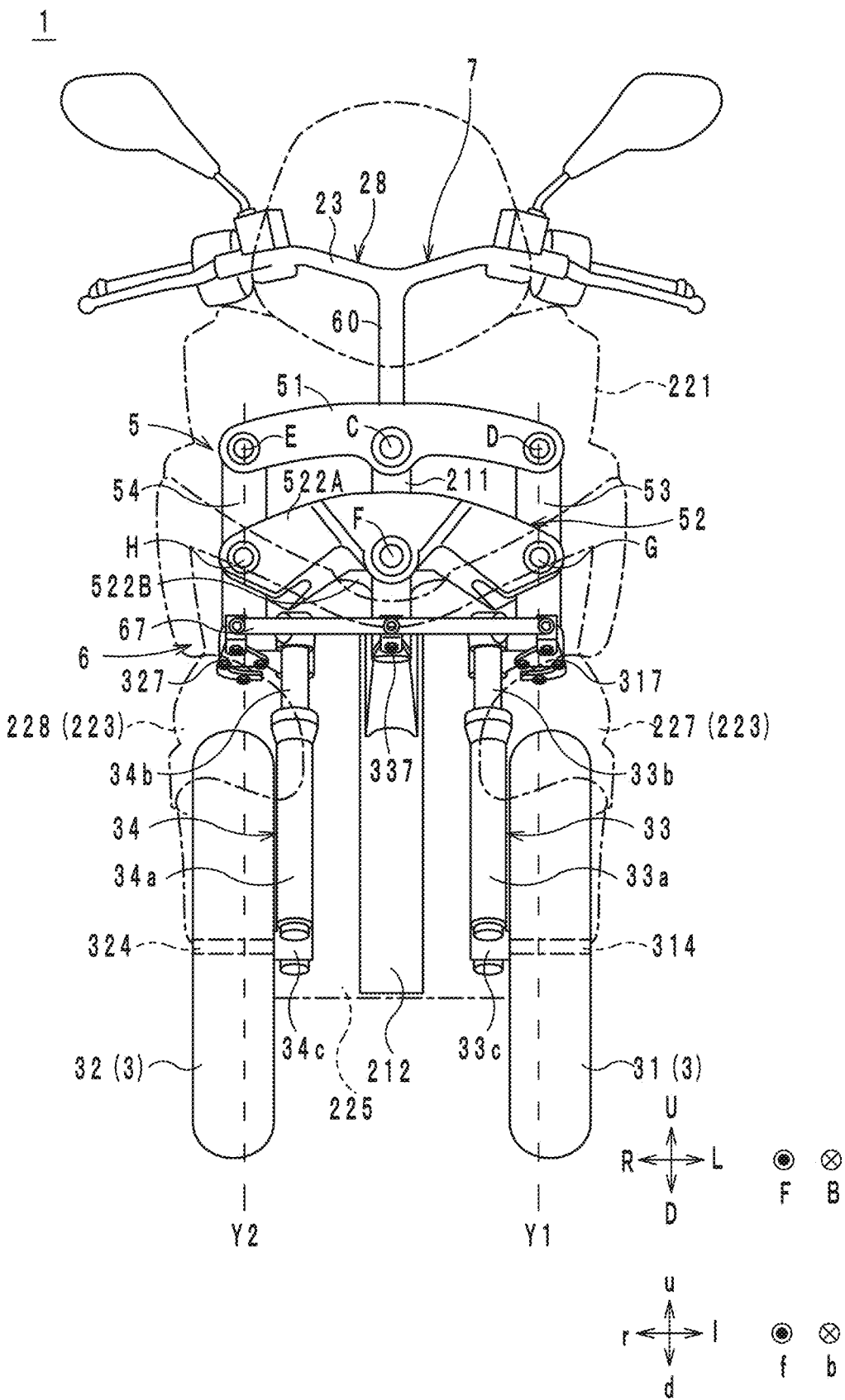
FIG. 2 is a view of a front portion of the leaning vehicle 1 viewed from the front "F".

The steering mechanism 7 is explained below with reference to FIG. 2 and FIG. 3. FIG. 2 is a view of the front portion of the leaning vehicle 1 viewed from the front "F". FIG. 3 is a view of the front portion of the leaning vehicle 1 viewed from above "U". In FIG. 2 and FIG. 3, the vehicle body cover 22 is shown in a transparent state. As shown in FIG. 2 and FIG. 3, the steering mechanism 7 includes a steering-force transmitter 6, a left buffer 33, a right buffer 34, and a pair of left and right front wheels 3.

The pair of left and right front wheels 3 includes a left front wheel 31 (an example of a left steerable wheel) and a right front wheel 32 (an example of a right steerable wheel). The left front wheel 31 is disposed farther in the leftward direction "l" than the center in the left right direction "lr" of the vehicle body frame 21. The right front wheel 32 is disposed farther in the rightward direction "r" than the center in the left right direction "lr" of the vehicle body frame 21. The left front wheel 31 and the right front wheel 32 are disposed symmetrically with respect to the center in the left right direction "lr" of the vehicle body frame 21 in the upright state. A left front fender 227 is disposed above "u" the left front wheel 31. A right front fender 228 is disposed above "u" the right front wheel 32. The left front wheel 31 is supported by the left buffer 33. The right front wheel 32 is supported by the right buffer 34.

The left buffer 33 includes a left lower section 33a, a left upper section 33b, and a left supporting section 33c. The left lower section 33a extends in the up down direction "ud". The left supporting section 33c is disposed at the lower end portion of the left lower section 33a. The left supporting section 33c rotatably supports the left front wheel 31. The left front wheel 31 rotates around a left front wheel axle 314 (an example of a left steerable wheel axle). The left front wheel axle 314 extends in the leftward direction "l" from the left supporting section 33c. The left upper section 33b extends in the up down direction "ud". The left upper section 33b is disposed above "u" the left lower section 33a in a state in which a lower end vicinity of the left upper section 33b is inserted into the left lower section 33a. The upper end portion of the left upper section 33b is fixed to a left bracket 317.

The left buffer 33 is a buffer of a so-called telescopic type. The left upper section 33b relatively moves in an extending direction of the left lower section 33a with respect to the left lower section 33a, such that the left buffer 33 extends and contracts in that direction. Consequently, the left buffer 33 buffers displacement in the up down direction "ud" of the front wheel 31 with respect to the left upper section 33b.

The right buffer 34 includes a right lower section 34a, a right upper section 34b, and a right supporting section 34c. The right lower section 34a extends in the up down direction "ud". The right supporting section 34c is disposed at the lower end portion of the right lower section 34a. The right supporting section 34c rotatably supports the right front wheel 32. The right front wheel 32 rotates around a right front wheel axle 324 (an example of a right steerable wheel axle). The right front wheel axle 324 extends in the rightward direction "r" from the right supporting section 34c. The right upper section 34b extends in the up down direction "ud". The right upper section 34b is disposed above "u" the right lower section 34a in a state in which a lower end vicinity of the right upper section 34b is inserted into the right lower section 34a. The upper end portion of the right upper section 34b is fixed to a right bracket 327.

The right buffer 34 is a buffer of a so-called telescopic type. The right upper section 34b relatively moves in an extending direction of the right lower section 34a with respect to the right lower section 34a, such that the right buffer 34 extends and contracts in that direction. Consequently, the right buffer 34 buffers displacement in the up down direction "ud" of the front wheel 32 with respect to the right upper section 34b.

The steering-force transmitter 6 is disposed farther in the upward direction "u" than the left front wheel 31 and the right front wheel 32. The steering-force transmitter 6 includes a steering member 28, a tie rod 67, a left bracket 317, a right bracket 327, and a bracket 337. The steering member 28 is a member to which a steering force of the rider is input. The steering member 28 includes a steering shaft 60 and a handle 23. The handle 23 is coupled to an upper portion of the steering shaft 60. The steering shaft 60 is rotatably supported by the vehicle body frame 21. The lower end portion of the steering shaft 60 is located farther in the frontward direction "f" than the upper end portion of the steering shaft 60. A portion of the steering shaft 60 is inserted into the head pipe 211. The steering shaft 60 extends in the up down direction "ud". Consequently, the steering shaft 60 is capable of rotating around the center axis of the steering shaft 60 extending in the up down direction "ud". The steering shaft 60 is rotated according to an operation of the handle 23 by the rider. The bracket 337 is fixed to the lower end portion of the steering shaft 60. Accordingly, the bracket 337 is capable of rotating around the center axis of the steering shaft 60 together with the steering shaft 60.

The tie rod 67 transmits the rotation of the steering shaft 60 by the operation of the handle 23 to the left buffer 33 and the right buffer 34. The tie rod 67 extends in the left right direction "LR". The center in the left right direction of the tie rod 67 is supported by the bracket 337. The left end portion of the tie rod 67 is supported by the left bracket 317. The right end portion of the tie rod 67 is supported by the right bracket 327.

The linkage 5 is explained with reference to FIG. 2 and FIG. 3. The linkage 5 is preferably of a parallelogram link type. The linkage 5 is disposed farther in the downward direction "d" than the handle 23. The linkage 5 is supported by the head pipe 211 of the vehicle body frame 21.

The linkage 5 includes an upper cross member 51, a lower cross member 52, a left side member 53, and a right side member 54. The upper cross member 51, the lower cross member 52, the left side member 53, and the right side member 54 define a plurality of link members that are able to be displaced with respect to the vehicle body frame 21. The displacement in this specification includes displacement by a translational movement, displacement by a rotational movement, and displacement by a combination of the translational movement and the rotational movement.

The upper cross member 51 extends in the left right direction "LR". The upper cross member 51 is disposed in front "f" of the head pipe 211 and farther in the upward direction "u" than the left front wheel 31 and the right front wheel 32. The upper cross member 51 is supported on the head pipe 211 by a supporting section C. The supporting section C is located in an intermediate portion of the upper cross member 51 and an upper portion of the head pipe 211. The left portion of the upper cross member 51 defines a portion located leftmost when the upper cross member 51 is equally divided into three in the left right direction "LR". The right portion of the upper cross member 51 defines a portion located rightmost when the upper cross member 51 is equally divided into three in the left right direction "LR". The intermediate portion of the upper cross member 51 defines a portion located in the middle when the upper cross member 51 is equally divided into three in the left right direction "LR". The upper portion of the head pipe 211 defines the upper half of the head pipe 211. The lower portion of the head pipe 211 defines the lower half of the head pipe 211. The supporting section C includes a shaft extending in the front back direction "fb". The supporting section C extends from the head pipe 211 in the frontward direction "f" in a state in which the supporting section C slightly leans in the upward direction "u". The upper cross member 51 is capable of rotating with respect to the head pipe 211 around the supporting section C.

The lower cross member 52 includes a front lower cross member 522A and a rear lower cross member 522B. The front lower cross member 522A extends in the left right direction "LR". The front lower cross member 522A is disposed in front "f" of the head pipe 211 and farther in the downward direction "d" than the upper cross member 51 and farther in the upward direction "u" than the left front wheel 31 and the right front wheel 32. The front lower cross member 522A is supported on the head pipe 211 by a supporting section F. The supporting section F is located in an intermediate portion of the front lower cross member 522A and a lower portion of the head pipe 211. The left portion of the front lower cross member 522A defines a portion located leftmost when the front lower cross member 522A is equally divided into three in the left right direction "LR". The right portion of the front lower cross member 522A defines a portion located rightmost when the front lower cross member 522A is equally divided into three in the left right direction "LR". The intermediate portion of the front lower cross member 522A defines a portion located in the middle when the front lower cross member 522A is equally divided into three in the left right direction "LR". The supporting section F includes a shaft extending in the front back direction "fb". The supporting section F extends from the head pipe 211 in the frontward direction "f" in a state in which the supporting section F slightly leans in the upward direction "u". The front lower cross member 522A is capable of rotating with respect to the head pipe 211 around the supporting section F.

The rear lower cross member 522B extends in the left right direction "LR". The rear lower cross member 522B is disposed behind "b" the head pipe 211 and farther in the lower direction "d" than the upper cross member 51 and farther in the upward direction "u" than the left front wheel 31 and the right front wheel 32. The rear lower cross member 522B is supported on the head pipe 211 by the supporting section F. The supporting section F is located in an intermediate portion of the rear lower cross member 522B and a lower portion of the head pipe 211. The left portion of the rear lower cross member 522B defines a portion located leftmost when the rear lower cross member 522B is equally divided into three in the left right direction "LR". The right portion of the rear lower cross member 522B defines a portion located rightmost when the rear lower cross member 522B is equally divided into three in the left right direction "LR". The intermediate portion of the rear lower cross member 522B defines a portion located in the middle when the rear lower cross member 522B is equally divided into three in the left right direction "LR". The supporting section F includes a shaft extending in the front back direction "fb" as explained above. However, the supporting section F extends from the head pipe 211 in the backward direction "b" in a state in which the supporting section F slightly leans in the downward direction "d". The rear lower cross member 522B is capable of rotating with respect to the head pipe 211 around the supporting section F.

The left side member 53 extends in the up down direction "ud". Therefore, the extending direction of the left side member 53 is parallel to the extending direction of the head pipe 211. The left side member 53 is disposed to the left "l" of the head pipe 211. The left side member 53 is disposed above "u" the left front wheel 31 and farther in the upward direction "u" than the left buffer 33. The left side member 53 is supported on the upper cross member 51 by a supporting section D. The supporting section D is located in an upper portion of the left side member 53 and a left portion of the upper cross member 51. In the left side member 53, the upper portion of the left side member 53 defines the upper half of the left side member 53. The lower portion of the left side member 53 defines the lower half of the left side member 53. The supporting section D includes a shaft extending in the front back direction "fb". The left side member 53 is capable of rotating with respect to the upper cross member 51 around the supporting section D.

The left side member 53 is supported on the front lower cross member 522A and the rear lower cross member 522B by a supporting section G. The supporting section G is located in a lower portion of the left side member 53, a left portion of the front lower cross member 522A, and a left portion of the rear lower cross member 522B. The supporting section G includes a shaft extending in the front back direction "fb". The left side member 53 is capable of rotating with respect to the front lower cross member 522A and the rear lower cross member 522B around the supporting section G.

The left bracket 317 is supported at the lower end portion of the left side member 53. The left bracket 317 is capable of rotating with respect to the left side member 53 around a left center axis Y1. The left center axis Y1 is a center axis of the left side member 53. Therefore, the left center axis Y1 extends in the up down direction "ud".

The right side member 54 extends in the up down direction "ud". Therefore, the extending direction of the right side member 54 is parallel to the extending direction of the head pipe 211. The right side member 54 is disposed to the right "r" of the head pipe 211. The right side member 54 is disposed above "u" the right front wheel 32 and farther in the upward direction "u" than the right buffer 34. The right side member 54 is supported on the upper cross member 51 by a supporting section E. The supporting section E is located in an upper portion of the right side member 54 and a right portion of the upper cross member 51. In the right side member 54, the upper portion of the right side member 54 defines the upper half of the right side member 54. The lower portion of the right side member 54 defines the lower half of the right side member 54. The supporting section E includes a shaft extending in the front back direction "fb". The right side member 54 is capable of rotating with respect to the upper cross member 51 around the supporting section E.

The right side member 54 is supported on the front lower cross member 522A and the rear lower cross member 522B by a supporting section H. The supporting section H is located in a lower portion of the right side member 54, a right portion of the front lower cross member 522A, and a right portion of the rear lower cross member 522B. The supporting section H includes a shaft extending in the front back direction "fb". The right side member 54 is capable of rotating with respect to the front lower cross member 522A and the rear lower cross member 522B around the supporting section H.

The right bracket 327 is supported at the lower end portion of the right side member 54. The right bracket 327 is capable of rotating with respect to the right side member 54 around a right center axis Y2. The right center axis Y2 is the center axis of the right side member 54. Therefore, the right center axis Y2 extends in the up down direction "ud".

As explained above, the upper cross member 51, the lower cross member 52, the left side member 53, and the right side member 54 are coupled such that the upper cross member 51 and the lower cross member 52 keep postures parallel to each other and the left side member 53 and the right side member 54 keep postures parallel to each other.

The linkage 5 includes the left buffer 33. The left buffer 33 is disposed below "d" the left side member 53. The left buffer 33 is supported by the left bracket 317. Specifically, the upper end portion of the left buffer 33 is fixed to the left bracket 317. Further, the left buffer 33 supports the left front wheel 31. Therefore, the left side member 53 supports the left front wheel 31 via the left bracket 317 and the left buffer 33. That is, the linkage 5 supports the left front wheel 31. The left buffer 33 leans in the left right direction "LR" together with the left side member 53.

The linkage 5 includes the right buffer 34. The right buffer 34 is disposed below "d" the right side member 54. The right buffer 34 is supported by the right bracket 327. Specifically, the upper end of the right buffer 34 is fixed to the right bracket 327. Further, the right buffer 34 supports the right front wheel 32. Therefore, the right side member 54 supports the right front wheel 32 via the right bracket 327 and the right buffer 34. That is, the linkage 5 supports the right front wheel 32. The right buffer 34 leans in the left right direction "LR" together with the right side member 54.

A steering motion of the leaning vehicle 1 is explained below with reference to FIG. 4. FIG. 4 is a view of the front portion of the leaning vehicle 1 in a left-steered state viewed from above "U".

As shown in FIG. 4, when the rider steers the handle 23 to the left, the steering shaft 60 rotates counterclockwise when the leaning vehicle 1 is viewed from above "U". Since the bracket 337 is fixed to the lower end of the steering shaft 60, the bracket 337 rotates counterclockwise together with the steering shaft 60 when the leaning vehicle 1 is viewed from above "U".

The tie rod 67 translates in the leftward direction "L" and the backward direction "B" according to the rotation of the bracket 337. The left end portion of the tie rod 67 is supported by the front end portion of the left bracket 317. The left bracket 317 is capable of rotating around the left center axis Y1 (see FIG. 2). Therefore, according to the translational movement of the tie rod 67, the left bracket 317 rotates counterclockwise when the leaning vehicle 1 is viewed from above "U". The right end portion of the tie rod 67 is supported by the front end portion of the right bracket 327. The right bracket 327 is capable of rotating around the right center axis Y2 (see FIG. 2). Therefore, according to the translational movement of the tie rod 67, the right bracket 327 rotates counterclockwise when the leaning vehicle 1 is viewed from above "U".

The left front wheel 31 is connected to the left bracket 317 via the left buffer 33. Therefore, according to the rotation of the left bracket 317, the left front wheel 31 rotates counterclockwise around the left center axis Y1 (see FIG. 2) when the leaning vehicle 1 is viewed from above "U". The right front wheel 32 is connected to the right bracket 327 via the right buffer 34. Therefore, according to the rotation of the right bracket 327, the right front wheel 32 rotates counterclockwise around the right center axis Y2 (see FIG. 2) when the leaning vehicle 1 is viewed from above "U".

Note that, when the rider steers the handle 23 to the right, the elements explained above rotate in the opposite direction (i.e., clockwise) of the direction in which the elements rotate when the handle is steered to the left. Since the movements of the elements are only reversed in the left and the right, further explanation of the movements is omitted.

Figure 5:
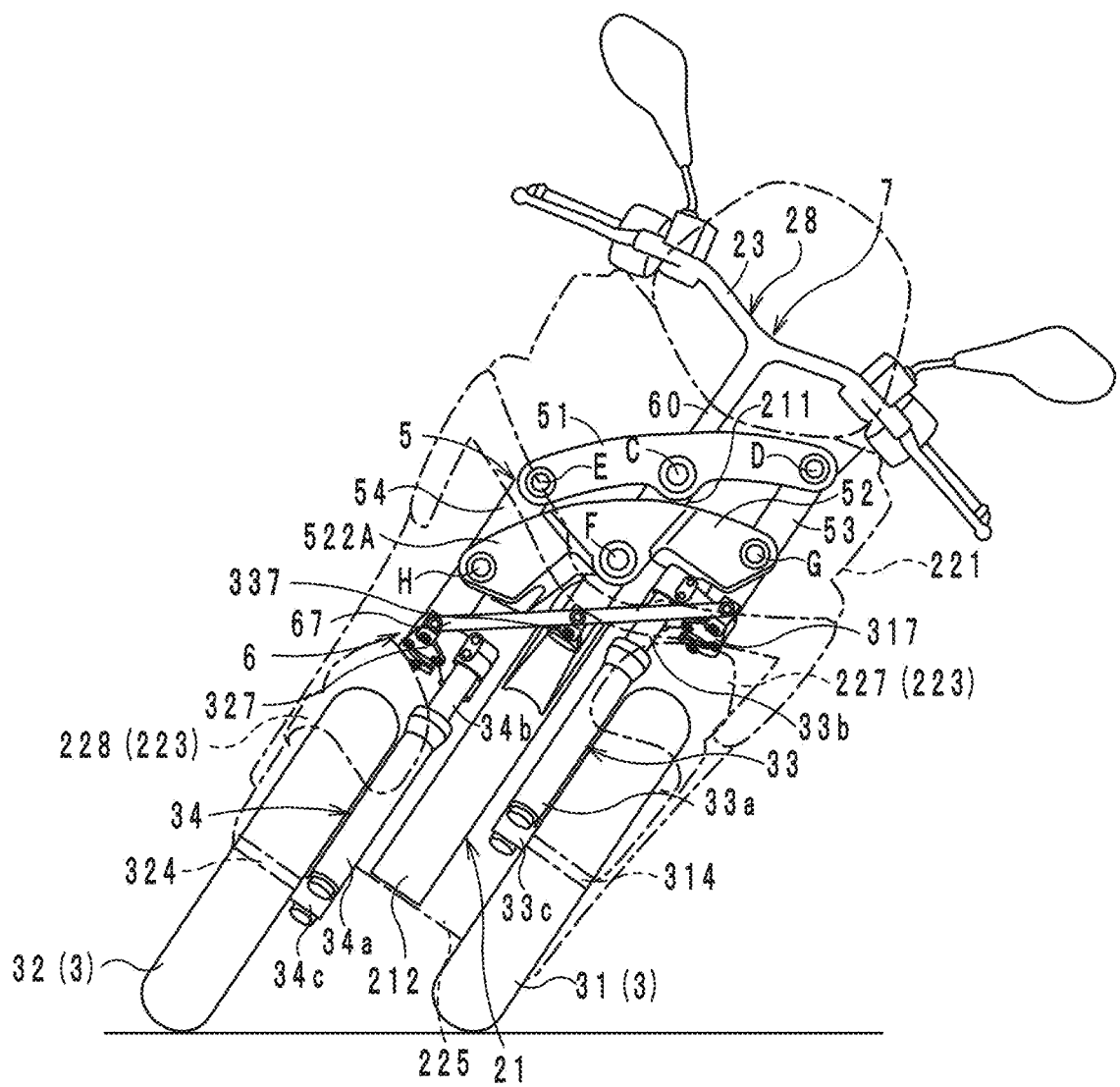
FIG. 5 is a view of the front portion of the leaning vehicle 1, which is viewed from the front "F", in a leaned state toward a leftward direction "L" of a vehicle body frame 21.

A leaning motion of the leaning vehicle 1 is explained below with reference to FIG. 5. FIG. 5 is a view of the front portion of the leaning vehicle 1, which is viewed from the front "F", in a leaned state to the left "L" of the vehicle body frame 21.

As shown in FIG. 5, the upper cross member 51, the lower cross member 52, the left side member 53, and the right side member 54 and the vehicle body frame 21 are relatively displaced such that the left front wheel axle 314 is located farther in the upward direction "u" than the right front wheel axle 324, such that the linkage 5 leans the vehicle body frame 21 to the left "L" during a left turn. The upper cross member 51, the lower cross member 52, the left side member 53, and the right side member 54 and the vehicle body frame 21 are relatively displaced such that the right front wheel axle 324 is located farther in the upward direction "u" than the left front wheel axle 314, such that the linkage 5 leans the vehicle body frame 21 to the rightward direction "R" during a right turn. In the following explanation, an example is explained in which the vehicle body frame 21 leans in leftward direction "L".

As shown in FIG. 5, the shape of the linkage 5 changes, such that the vehicle body frame 21 in the upright state leans in leftward direction "L". Specifically, as shown in FIG. 2, in the leaning vehicle 1 in which the vehicle body frame 21 is in the upright state, the upper cross member 51, the lower cross member 52, the left side member 53, and the right side member 54 have a rectangular shape. On the other hand, as shown in FIG. 5, in the leaning vehicle 1 in which the vehicle body frame 21 leans in leftward direction "L", the upper cross member 51, the lower cross member 52, the left side member 53, and the right side member 54 have parallelogram shapes.

When the rider leans the vehicle body frame 21 to the left "L", the head pipe 211 leans in leftward direction "L". When the head pipe 211 leans in leftward direction "L", the upper cross member 51 rotates counterclockwise with respect to the head pipe 211 around the supporting section C when the leaning vehicle 1 is viewed from the front "F". Similarly, the lower cross member 52 rotates counterclockwise with respect to the head pipe 211 around the supporting section F when the leaning vehicle 1 is viewed from the front "F". Consequently, the upper cross member 51 moves in the leftward direction "L" with respect to the lower cross member 52 when the leaning vehicle 1 is viewed from the front "F".

According to the movement of the upper cross member 51, the left side member 53 rotates clockwise with respect to the upper cross member 51 around the supporting section D when the leaning vehicle 1 is viewed from the front "F". Similarly, the right side member 54 rotates clockwise with respect to the upper cross member 51 around the supporting section E when the leaning vehicle 1 is viewed from the front "F". According to the movement of the upper cross member 51, the left side member 53 rotates clockwise with respect to the lower cross member 52 around the supporting section G when the leaning vehicle 1 is viewed from the front "F". Similarly, the right side member 54 rotates clockwise with respect to the lower cross member 52 around the supporting section H when the leaning vehicle 1 is viewed from the front "F". Consequently the left side member 53 and the right side member 54 lean in leftward direction "L" while keeping a state parallel to the head pipe 211.

The left bracket 317 is supported by the lower end portion of the left side member 53. Therefore, the left bracket 317 leans in leftward direction "L" according to the leaning to the left "L" of the left side member 53. Since the left buffer 33 is supported by the left bracket 317, the left buffer 33 leans in leftward direction "L" according to the leaning to the left "L" of the left bracket 317. Since the left front wheel 31 is supported by the lower end portion of the left buffer 33, the left front wheel 31 leans in leftward direction "L" according to the leaning to the left "L" of the left buffer 33.

The right bracket 327 is supported by the lower end portion of the right side member 54. Therefore, the right bracket 327 leans in leftward direction "L" according to the leaning to the left "L" of the right side member 54. Since the right buffer 34 is supported by the right bracket 327, the right buffer 34 leans in leftward direction "L" according to the leaning to the left "L" of the right bracket 327. Since the right front wheel 32 is supported by the lower end portion of the right buffer 34, the right front wheel 32 leans in leftward direction "L" according to the leaning to the left "L" of the right buffer 34.

The above explanation about the leaning motions of the left front wheel 31 and the right front wheel 32 is based on the vertical direction. However, the vehicle-body-frame (21) up-down direction "ud" and the vertical up down direction do not coincide during the leaning motion of the leaning vehicle 1 (during the motion of the linkage 5). Based on the vehicle-body-frame (21) up-down direction "ud", relative positions in the vehicle-body-frame (21) up-down direction "ud" of the left front wheel 31 and the right front wheel 32 change during the operation of the linkage 5. In other words, the linkage 5 changes the relative positions of the left front wheel 31 and the right front wheel 32 in the vehicle-body-frame (21) up-down direction "ud" to lean the vehicle body frame 21 to the left "L" or the right "R".

Note that, when the vehicle body frame 21 leans in rightward direction "R", the elements explained above rotate in the opposite direction of the direction in which the elements rotate when the vehicle body frame 21 leans in leftward direction "L". Since the movements of the elements are only reversed in the left and the right, further explanation of the movements is omitted.

A resistance-force changer 8 is explained below with reference to FIG. 6. FIG. 6 is a view of the front portion of the leaning vehicle 1 viewed from the front "F".

As shown in FIG. 6, the leaning vehicle 1 includes the resistance-force changer 8. The resistance-force changer 8 changes a resistance force applied to a motion in which the vehicle body frame 21 and the plurality of link members (the upper cross member 51, the lower cross member 52, the left side member 53, and the right side member 54) are relatively displaced. In this preferred embodiment, the resistance-force changer 8 is able to switch between a locked state in which the vehicle body frame 21 and the plurality of link members cannot be relatively displaced and an unlocked state in which the vehicle body frame 21 and the plurality of link members are able to be relatively displaced. In the locked state, a relatively large resistance force is applied to the motion in which the vehicle body frame 21 and the plurality of link members are relatively displaced. In the unlocked state, a relatively small resistance force is applied or no resistance force is applied to the motion in which the vehicle body frame 21 and the plurality of link members are relatively displaced. The resistance-force changer 8 is provided in front "f" of the linkage 5. The resistance-force changer 8 includes a supporting frame 81, a plate 82, a caliper 83, a restrictor 84, a transmitter 85, and an electric motor 86.

The supporting frame 81 is fixed to the lower cross member 52. Therefore, the supporting frame 81 is capable of rotating around the supporting section F together with the lower cross member 52. Consequently, the supporting frame 81 is able to be displaced with respect to the head pipe 211.

The vehicle body frame 21 includes a front frame 213 indicated by a broken line. The front frame 213 is disposed in front "f" of the linkage 5. The caliper 83 is fixed to the front frame 213. Consequently, the caliper 83 cannot be displaced with respect to the head pipe 211.

The caliper 83 (an example of a first frictional-member driver) includes pads 831A and 831B (an example of a first frictional member). The pads 831A and 831B are disposed in this order from the front "F" to back "b". The pads 831A and 831B are made of a high-friction material. The pads 831A and 831B are displaceable in the front back direction "fb" such that an interval between the pads 831A and 831B changes. The plate 82 (an example of a second frictional member) is located between the pads 831A and 831B. The plate 82 linearly extends in the left right direction "lr".

The electric motor 86 is fixed to the caliper 83. The electric motor 86 receives a supply of electric power to generate a driving force to change the interval between the pads 831A and 831B. A rider operates a not-shown switch provided in the handle 23, such that the electric motor 86 operates. Consequently, the interval between the pads 831A and 831B changes. In a state in which the interval between the pads 831A and 831B is relatively small, the pad 831A comes into contact with the front surface of the plate 82 and the pad 831B comes into contact with the rear surface of the plate 82. At this time, the caliper 83 holds the plate 82. A state in which the caliper 83 holds the plate 82 is the locked state. On the other hand, in a state in which the interval between the pads 831A and 831B is relatively large, the pad 831A does not come into contact with the front surface of the plate 82 and the pad 831B does not come into contact with the rear surface of the plate 82. At this time, the caliper 83 does not hold the plate 82. A state in which the caliper 83 does not hold the plate 82 is the unlocked state.

The restrictor 84 and the transmitter 85 relatively displace the plate 82 and the caliper 83. The restrictor 84 includes a first restrictor 841, a second restrictor 842, and a third restrictor 843. The first restrictor 841, the second restrictor 842, and the third restrictor 843 are supported by the front frame 213 via a not-shown supporting structure.

The first restrictor 841 and the second restrictor 842 are disposed farther in the rightward direction "r" than the head pipe 211. The first restrictor 841 is disposed in a position where the first restrictor 841 is able to be in contact with the upper edge of the plate 82. The second restrictor 842 is disposed in a position where the second restrictor 842 is able to be in contact with the lower edge of the plate 82. The third restrictor 843 is disposed farther in the leftward direction "l" than the head pipe 211. The third restrictor 843 is disposed in a position where the third restrictor 843 is able to be in contact with the upper edge of the plate 82. Accordingly, the restrictor 84 restricts displacement of the plate 82 to the up down direction "ud" in three places.

The transmitter 85 extends in the left right direction "lr". However, when the transmitter 85 is viewed from the front "F", the transmitter 85 has an L shape bent in the upward direction "u" in a right end portion vicinity of the transmitter 85. The transmitter 85 is supported on the supporting frame 81 by an upstream-side coupling section 851. The upstream-side coupling section 851 is located at the right end portion of the transmitter 85 and the upper end portion of the supporting frame 81. The upstream-side coupling section 851 includes a shaft extending in the front back direction "fb". The transmitter 85 is capable of rotating with respect to the supporting frame 81 around the upstream-side coupling section 851.

The transmitter 85 is supported on the plate 82 by a downstream-side coupling section 852. The downstream-side coupling section 852 is located at the upper left end portion of the transmitter 85 and the left end portion of the plate 82. The downstream-side coupling section 852 includes a shaft extending in the front back direction "fb". The transmitter 85 is capable of rotating with respect to the plate 82 around the downstream-side coupling section 852.

Figure 8:
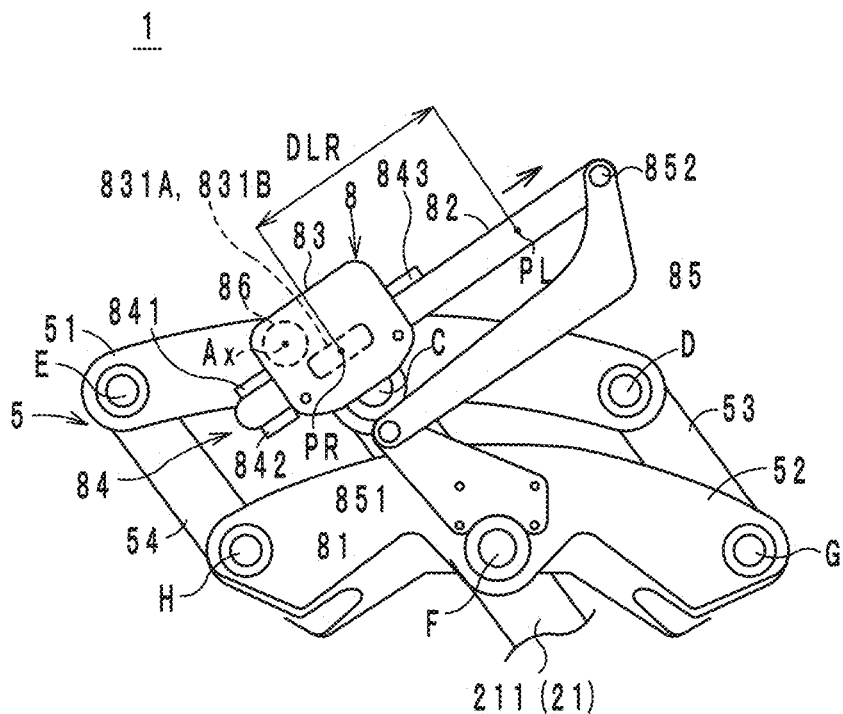
FIG. 8 is a view of the resistance-force changer 8, which is viewed from the front "F", in a leaned state toward a rightward direction "R" of the vehicle body frame 21.

Operation of the resistance-force changer is explained with reference to the drawings. FIG. 7 is a view of the resistance-force changer 8, which is viewed from the front "F", in a leaned state in the leftward direction "L" of the vehicle body frame 21. FIG. 8 is a view of the resistance-force changer 8, which is viewed from the front "F", in a leaned state in the rightward direction "R" of the vehicle body frame 21.

First, the operation of the resistance-force changer 8 at the time when the vehicle body frame 21 in the upright state leans in leftward direction "L" is explained with reference to FIG. 7. As explained with reference to FIG. 5, when the rider leans the vehicle body frame 21 to the left "L", the head pipe 211 leans in leftward direction "L". As shown in FIG. 8, the caliper 83 and the restrictor 84 are fixed to the front frame 213. Therefore, when the head pipe 211 leans in leftward direction "L", the caliper 83 and the restrictor 84 lean in leftward direction "L". That is, when the leaning vehicle 1 is viewed from the front "F", the caliper 83 and the restrictor 84 rotate clockwise and move in the leftward direction "L" and the downward direction "D".

The plate 82 is supported by the restrictor 84. Therefore, when the restrictor 84 rotates clockwise when the leaning vehicle 1 is viewed from the front "F", the plate 82 also rotates clockwise around the downstream-side coupling section 852. Further, when the caliper 83 and the restrictor 84 move in the leftward direction "L" and the downward direction "D", the plate 82 receives forces in the leftward direction "L" from the caliper 83 and the restrictor 84. Therefore, the transmitter 85 receives a force in the leftward direction "L" from the plate 82 in the downstream-side coupling section 852. The downstream-side coupling section 852 is located farther in the upward direction "u" than the upstream-side coupling section 851. Accordingly, the transmitter 85 receives, from the plate 82, a rotational moment that rotates clockwise around the upstream-side coupling section 851 when the leaning vehicle 1 is viewed from the front "F". Consequently, the transmitter 85 rotates clockwise around the upstream-side coupling section 851 when the leaning vehicle 1 is viewed from the front "F". According to the operation explained above, the caliper 83 and the restrictor 84 are able to smoothly move in the leftward direction "l" along the plate 82.

The operation of the resistance-force changer 8 at the time when the vehicle body frame 21 in the upright state leans in rightward direction "R" is explained with reference to FIG. 8. When the rider leans the vehicle body frame 21 to the rightward direction "R", the head pipe 211 leans in rightward direction "R". The caliper 83 and the restrictor 84 are fixed to the front frame 213. Therefore, when the head pipe 211 leans in rightward direction "R", the caliper 83 and the restrictor 84 lean in rightward direction "R". That is, when the leaning vehicle 1 is viewed from the front "F", the caliper 83 and the restrictor 84 rotate counterclockwise and move in the rightward direction "R" and the downward direction "D".

The plate 82 is supported by the restrictor 84. Therefore, when the restrictor 84 rotates counterclockwise when the leaning vehicle 1 is viewed from the front "F", the plate 82 also rotates counterclockwise around the downstream-side coupling section 852. Further, when the caliper 83 and the restrictor 84 move in the right ward direction "R" and the downward direction "D", the plate 82 receives forces in the rightward direction "R" from the caliper 83 and the restrictor 84. Therefore, the transmitter 85 receives a force in the rightward direction "R" from the plate 82 in the downstream-side coupling section 852. The downstream-side coupling section 852 is located farther in the upward direction "u" than the upstream-side coupling section 851. Accordingly, when the leaning vehicle 1 is viewed from the front "F", the transmitter 85 receives, from the plate 82, a rotational moment that rotates counterclockwise around the upstream-side coupling section 851. Consequently, when the leaning vehicle 1 is viewed from the front "F", the transmitter 85 rotates counterclockwise around the upstream-side coupling section 851. According to the operation explained above, the caliper 83 and the restrictor 84 are able to smoothly move in the rightward direction "r" along the plate 82.

As explained above, the resistance-force changer 8 is configured such that the plate 82 and the pads 831A and 831B of the caliper 83 are relatively displaced in association with the relative displacement of the vehicle body frame 21 and the plurality of link members (the upper cross member 51, the lower cross member 52, the left side member 53, and the right side member 54).

Incidentally when the rider operates the not-shown switch provided in the handle 23 during the motion in which the plate 82 and the caliper 83 are relatively displaced, the pads 831A and 831B respectively come into contact with the front surface and the rear surface of the plate 82. Consequently, a frictional force is generated between the plate 82 and the pads 831A and 831B. The resistance force applied to the motion in which the plate 82 and the caliper 83 are relatively displaced increases. The plate 82 is supported by the lower cross member 52 via the supporting frame 81 and the transmitter 85. The caliper 83 is supported by the head pipe 211. Therefore, when the resistance force applied to the motion in which the plate 82 is displaced with respect to the caliper 83 increases, a resistance force applied to a motion in which the lower cross member 52 rotates with respect to the head pipe 211 also increases. That is, a resistance applied to a motion in which the upper cross member 51, the lower cross member 52, the left side member 53, and the right side member 54 and the vehicle body frame 21 are relatively displaced increases. As explained above, the resistance-force changer 8 changes a contact state of the pads 831A and 831B and the plate 82 to change a resistance force applied to a motion in which the vehicle body frame 21 and the plurality of link members (the upper cross member 51, the lower cross member 52, the left side member 53, and the right side member 54) are relatively displaced.

Figure 9:
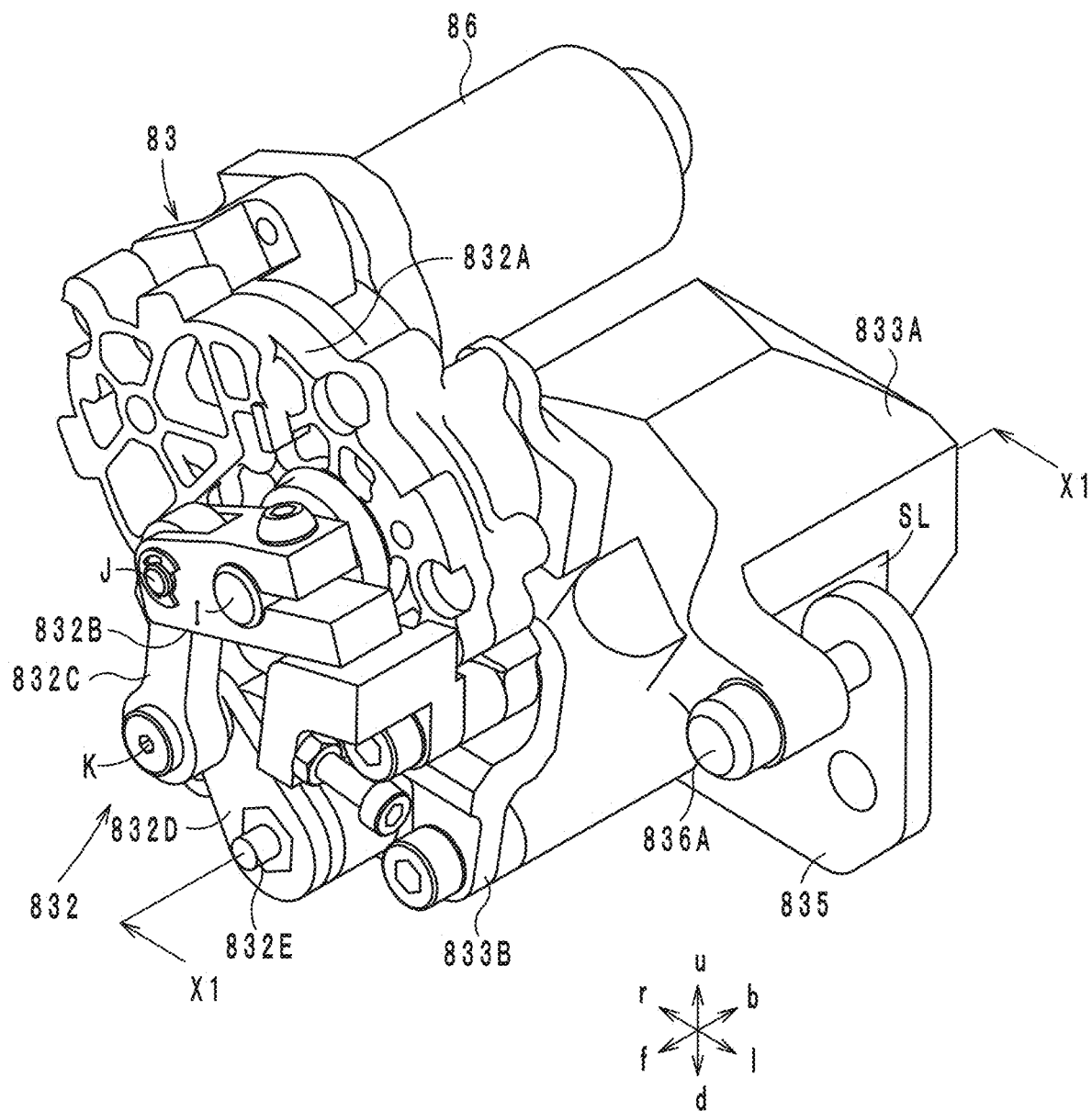
FIG. 9 is an exterior perspective view of a caliper 83 and an electric motor 86.
Figure 10:
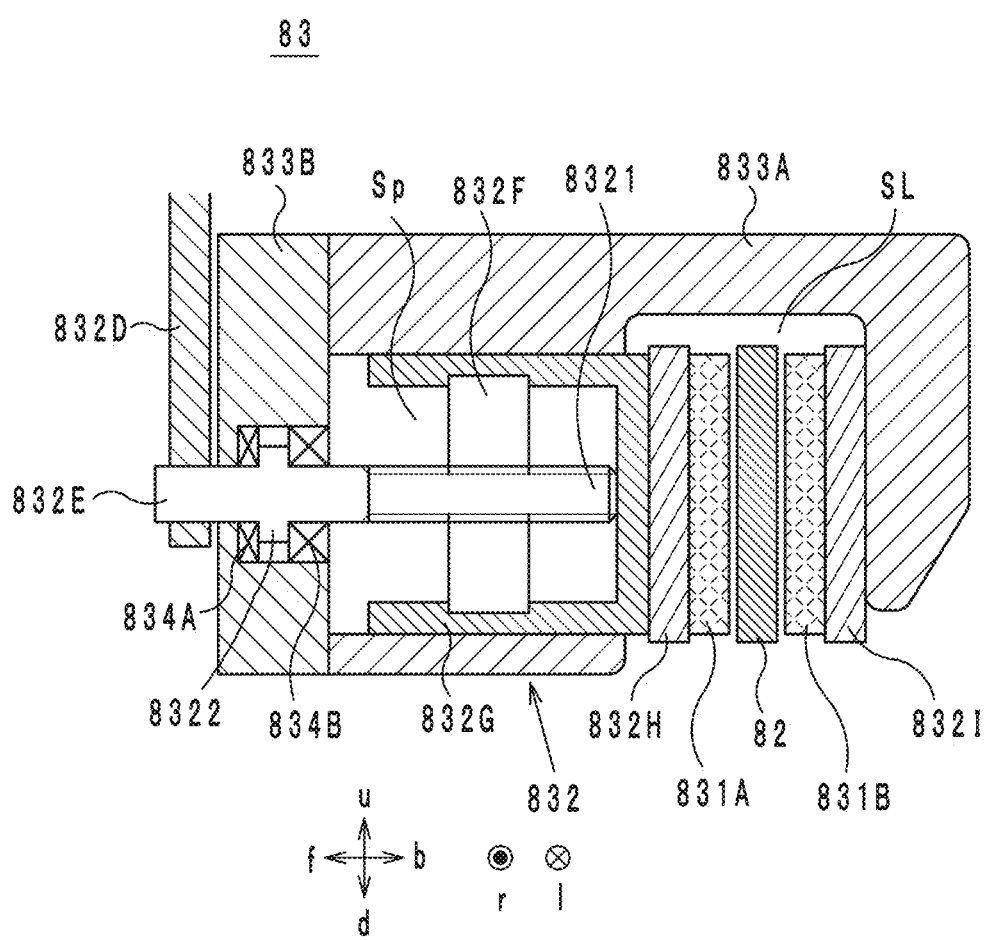
FIG. 10 is a sectional view along X1-X1 of the caliper 83 shown in FIG. 9.
Figure 11:
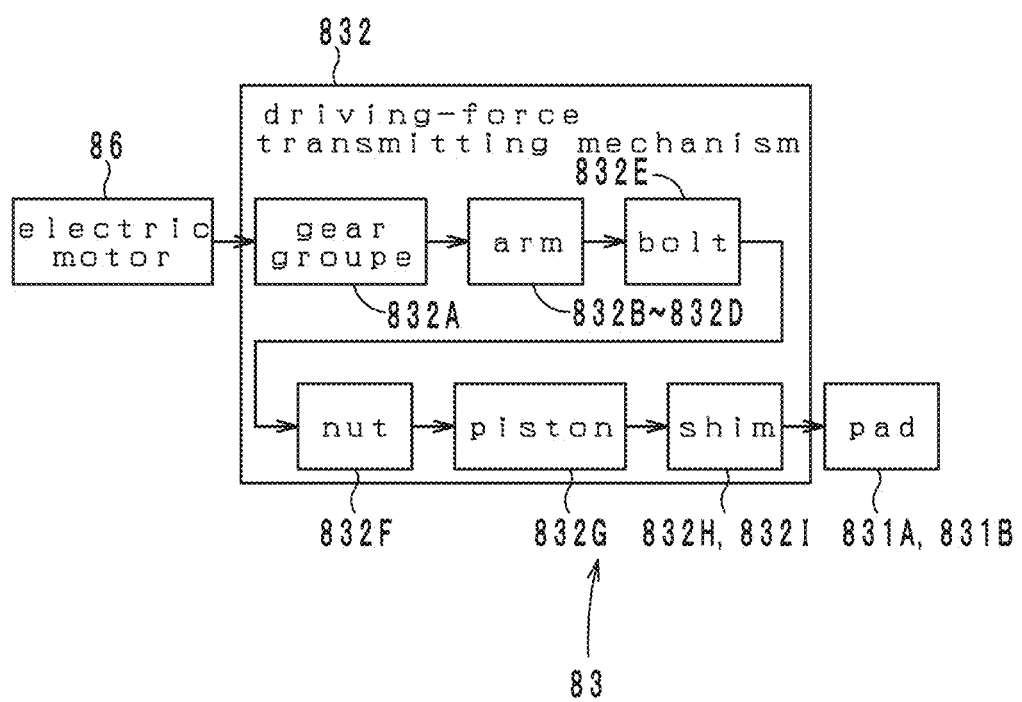
FIG. 11 is a functional block diagram of the caliper 83 and the electric motor 86.

A specific configuration of the caliper 83 is explained with reference to the drawings. FIG. 9 is an exterior perspective view of the caliper 83 and the electric motor 86. FIG. 10 is a sectional view in X1-X1 of the caliper 83 shown in FIG. 9. In FIG. 10, a sectional view of the caliper 83 in the unlocked state is shown. The sectional view of FIG. 10 is schematically shown. Therefore, the dimensions of FIG. 10 do not strictly coincide with the dimensions of FIG. 9. FIG. 11 is a functional block diagram of the caliper 83 and the electric motor 86. FIG. 12 is a view of the caliper 83 in the unlocked state viewed from the front "F".

The caliper 83 is a caliper of a so-called float type. The caliper 83 includes, as shown in FIG. 9, a rear caliper body 833A and a front caliper body 833B. The electric motor 86 is fixed to the rear surface of the rear caliper body 833A. The front caliper body 833B covers the front surface of the rear caliper body 833A.

As shown in FIG. 10, a slit SL and a through-hole Sp are provided in the rear caliper body 833A. The slit SL traverses a block-shaped rear caliper body 833A in the left right direction "lr". Consequently, as shown in FIG. 9, the slit SL connects the right surface and the left surface of the rear caliper body 833A. However, in FIG. 9, it can be visually recognized that the slit SL is provided on the left surface of the rear caliper body 833A and it cannot be visually recognized that the slit SL is provided on the right surface of the rear caliper body 833A. Further, the slit SL is opened on the lower surface of the rear caliper body 833A. The plate 82 (not shown in FIG. 9) traverses the slit SL in the left right direction "lr". Therefore, the plate 82 extends from the slit SL in the leftward direction "l" and the rightward direction "r". As shown in FIG. 10, the through-hole Sp extends from the front surface of the rear caliper body 833A toward the backward direction "b". The through-hole Sp is connected to the slit SL. The through-hole Sp preferably has a circular shape when the caliper 83 is viewed from the front "F".

The caliper 83 includes, as shown in FIG. 11, the pads 831A and 831B and a driving-force transmitter 832. The driving-force transmitter 832 includes, as shown in FIG. 11, a gear group 832A, arms 832B, 832C, and 832D, a bolt 832E, a nut 832F, a piston 832G, and shims 832H and 832I. The driving-force transmitter 832 includes a rigid member that transmits a driving force generated by the electric motor 86 to the pads 831A and 831B. In this specification, the rigid member is a member that does not elastically deform during the motion of the caliper 83. The member that does not elastically deform is designed without considering a shape change due to elastic deformation during the motion of the caliper 83. Therefore, a member such as a wire used on the premise of elastic deformation during the motion of the caliper 83 is not included in the rigid member in this specification.

As shown in FIG. 9, the gear group 832A includes a plurality of gears housed in upper right portions of the rear caliper body 833A and the front caliper body 833B. In FIG. 9, the gear group 832A cannot be visually recognized because the gear group 832A is covered by the rear caliper body 833A and the front caliper body 833B. However, a reference sign and a leader line are added to a position where the gear group 832A is provided. The gear group 832A defines a reduction gear. Therefore, the gear group 832A reduces and outputs a rotating speed of the electric motor 86 and increases and outputs torque of the electric motor 86. A gear disposed on a most upstream side in the gear group 832A is fixed to a rotating shaft Ax (not shown in the figure) of the electric motor 86. Therefore, the gear disposed on the most upstream side in the gear group 832A rotates together with the rotating shaft Ax around the rotating shaft Ax (not shown in the figure). A gear disposed on a most downstream side in the gear group 832A is fixed to a supporting section I. The supporting section I includes a shaft extending in the front back direction "fb". The supporting section I pierces through the front caliper body 833B in the front back direction "fb". The gear disposed on the most downstream side in the gear group 832A rotates together with the supporting section I around the supporting section I.

The arm 832B is preferably a bar-shaped member. The arm 832B is disposed in front "f" of the front caliper body 833B. The arm 832B is fixed to the supporting section I. Consequently, the arm 832B is capable of rotating together with the supporting section I around the supporting section I. That is, when the electric motor 86 is driven and the rotating shaft Ax rotates, the gear group 832A rotates and the arm 832B rotates together with the supporting section I.

The bolt 832E includes, as shown in FIG. 10, a shaft section 8321 and an expanded diameter section 8322. The shaft section 8321 includes a shaft extending in the front back direction "fb". The shaft section 8321 pierces through the front caliper body 833B in the front back direction "fb". The shaft section 8321 coincides with the center axis of the through-hole Sp. A male screw is provided in a front portion of the shaft section 8321. The front portion of the shaft section 8321 defines the front half of the shaft section 8321. A rear portion of the shaft section 8321 defines the rear half of the shaft section 8321. The expanded diameter section 8322 has a diameter larger than the diameter of the shaft section 8321. The expanded diameter section 8322 is provided in the rear portion of the shaft section 8321. The shaft section 8321 is supported by bearings 834A and 834B, such that such a bolt 832E is capable of rotating with respect to the rear caliper body 833A and the front caliper body 833B.

The bearing 834A is adjacent to the expanded diameter section 8322 in the frontward direction "f" of the expanded diameter section 8322. The bearing 834B is adjacent to the expanded diameter section 8322 in the backward direction "b" of the expanded diameter section 8322. The bearings 834A and 834B are fixed to the front caliper body 833B. Consequently, the bolt 832E cannot move in the front back direction "fb" with respect to the front caliper body 833B.

As shown in FIG. 9, the arm 832D is preferably a bar-shaped member. The arm 832D is disposed in front "f" of the front caliper body 833B. The arm 832D is fixed to the front end portion of the shaft section 8321 of the bolt 832E. Consequently, the arm 832B is capable of rotating with respect to the rear caliper body 833A and the front caliper body 833B together with the bolt 832E around the shaft section 8321.

As shown in FIG. 9, the arm 832C is a bar-shaped member including a first end portion and a second end portion. The first end portion is an upper end portion of the two end portions of the arm 832C. The second end portion defines a lower end portion of the two end portions of the arm 832C. The arm 832C is disposed in front "f" of the front caliper body 833B. The arm 832C is supported on the arm 832B by a supporting section J. The supporting section J is located at the first end portion of the arm 832C and the distal end portion of the arm 832B. The distal end portion of the arm 832B is an end portion farther from the supporting section I of the two end portions of the arm 832B. The supporting section J includes a shaft extending in the front back direction "fb". The arm 832C is capable of rotating with respect to the arm 832B around the supporting section J.

As shown in FIG. 9, the arm 832C is supported on the arm 832D by a supporting section K. Specifically, the second end portion of the arm 832C is supported by the distal end portion of the arm 832D. The supporting section K is located at the second end portion of the arm 832C and the distal end portion of the arm 832D. The distal end portion of the arm 832D is an end portion farther from the supporting section E of the two end portions of the arm 832D. The supporting section K includes a shaft extending in the front back direction "fb". The arm 832C is capable of rotating with respect to the arm 832D around the supporting section K.

As shown in FIG. 10, the piston 832G includes a cylinder member having a center axis extending in the front back direction "fb". The piston 832G includes a rear portion that closes an opening located at a rear portion of the cylinder. The piston 832G does not include a front surface that closes an opening located at a front portion of the cylinder. The piston 832G is disposed in the through-hole Sp. The piston 832G is movable in the front back direction "fb" in the through-hole Sp.

As shown in FIG. 10, the nut 832F is disposed in the piston 832G. The nut 832F is fixed to the piston 832G. Accordingly, the nut 832F is capable of moving in the front back direction "fb" in the through-hole Sp together with the piston 832G. The nut 832F is attached to the male screw provided in the shaft section 8321 of the bolt 832E. Consequently, when the bolt 832E rotates counterclockwise when the caliper 83 is viewed from the front "F", the nut 832F moves in the backward direction "b" with respect to the bolt 832E. The piston 832G also moves in the backward direction "b" with respect to the bolt 832E according to the movement in the backward direction "b" of the nut 832F. When the bolt 832E rotates clockwise when the caliper 83 is viewed from the front "F", the nut 832F moves in the frontward direction "f" with respect to the bolt 832E. The piston 832G also moves in the frontward direction "f" with respect to the bolt 832E according to the movement in the frontward direction "f" of the nut 832F.

As shown in FIG. 10, the shim 832H is fixed to the rear surface of the piston 832G. The pad 831A is fixed to the rear surface of the shim 832H. Consequently, the pad 831A is opposed to the front surface of the plate 82.

As shown in FIG. 10, the shim 831I is fixed to a surface opposed to the rear surface of the plate 82. The surface included in the inner circumferential surface of the slit SL. The pad 831B is fixed to the front surface of the shim 832I. Consequently, the pad 831B is opposed to the rear surface of the plate 82.

The caliper 83 includes, as shown in FIG. 12, a caliper base 835 and slide pins 836A and 836B. As shown in FIG. 9, the caliper base 835 includes a tabular member. As shown in FIG. 6, the caliper base 835 is fixed to the front frame 213. The rear caliper body 833A is supported on the caliper base 835 by the slide pins 836A and 836B. The rear caliper body 833A is capable of moving in the front back direction "fb" with respect to the caliper base 835 along the slide pins 836A and 836B.

As shown in FIG. 9, the electric motor 86 is fixed to the rear caliper body 833A. Therefore, the electric motor 86 is integral with the caliper 83 and cannot be displaced with respect to the caliper 83. Further, the rear caliper body 833A is supported by the caliper base 835. The caliper base 835 is fixed to the front frame 213 (not shown in the figure). Therefore, the caliper 83 and the electric motor 86 are supported by the front frame 213 (not shown in the figure) via the caliper base 835. Accordingly, a position where the caliper 83 is supported in the front frame 213 (i.e., the vehicle body frame 21) and a position where the electric motor 86 is supported in the front frame 213 (i.e., the vehicle body frame 21) are the same. In other words, the caliper 83 and the electric motor 86 are supported by the front frame 213 via the same member (the caliper base 835).

Figure 13:
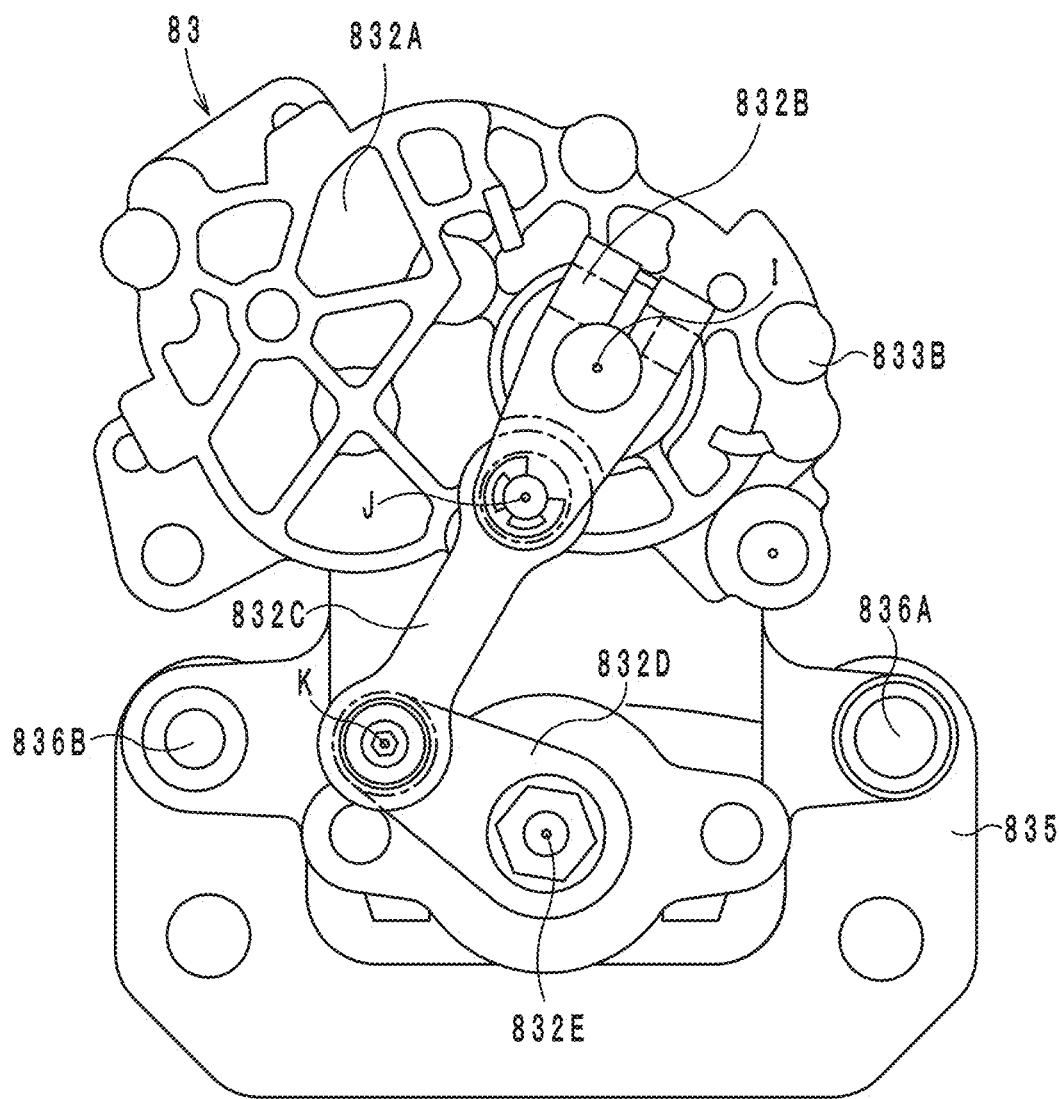
FIG. 13 is a view of the caliper 83 in a locked state viewed from the front "f".
Figure 14:
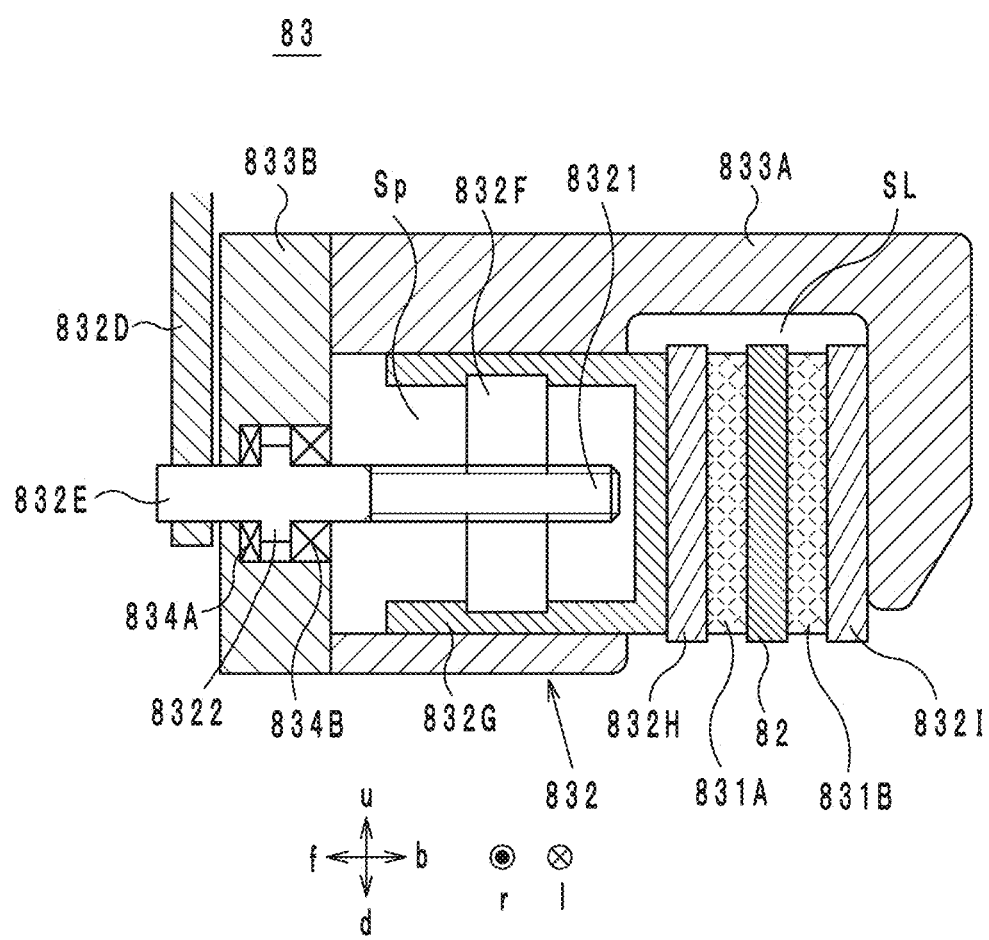
FIG. 14 is a sectional view along X1-X1 of the caliper 83 shown in FIG. 9.

The operation of the caliper 83 is explained with reference to FIG. 10, FIG. 12, FIG. 13, and FIG. 14. FIG. 13 is a view of the caliper 83 in the locked state viewed from the front "F". FIG. 14 is a sectional view in X1-X1 of the caliper 83 shown in FIG. 9. In FIG. 14, a sectional view of the caliper 83 in the locked state is shown.

Operation in which the caliper 83 changes from the unlocked state to the locked state is explained. In the unlocked state, as shown in FIG. 10, the pads 831A and 831B are not in contact with the plate 82. When the rider operates the not-shown switch provided in the handle 23, the electric motor 86 (not shown in FIG. 10, FIG. 12, FIG. 13, and FIG. 14) operates. A driving force of the electric motor 86 is transmitted to the arm 832B via the gear group 832A. When the caliper 83 is viewed from the front "F", the arm 832B is rotated counterclockwise. Consequently, the distal end of the arm 832B shown in FIG. 13 is located farther in the downstream side "d" than the distal end of the arm 832B shown in FIG. 12. The distal end portion of the arm 832B and the distal end portion of the arm 832D are coupled via the arm 832C. Therefore, the distal end portion of the arm 832D receives a force from the arm 832B toward the downward direction "d" via the arm 832C. The distal end portion of the arm 832D is located farther in the leftward direction "l" than the bolt 832E. Consequently, when the caliper 83 is viewed from the front "F", the arm 832D receives, from the arm 832C, a rotational moment that rotates counterclockwise around the bolt 832E. As a result, when the caliper 83 is viewed from the front "F", the arm 832D is rotated counterclockwise.

According to the rotation of the arm 832D, when the caliper 83 is viewed from the front "F", the bolt 832E is rotated counterclockwise. According to the rotation of the bolt 832E, the nut 832F is moved in the backward direction "b" with respect to the bolt 832E. According to the movement in the backward direction "b" of the nut 832F, the piston 832G is moved in the backward direction "b" with respect to the bolt 832E. Consequently, the pad 831A comes into contact with the front surface of the plate 82. However, in this state, the pad 831B is not in contact with the rear surface of the plate 82.

When the electric motor 86 further operates and the bolt 832E is rotated, the piston 832G presses the pad 831A against the front surface of the plate 82. However, the pad 831A cannot further move in the backward direction "b". Therefore, the plate 82 pushes the pad 831A in the frontward direction "f". A force of the plate 82 pushing the pad 831A in the frontward direction "f" is transmitted to the front caliper body 833B and the rear caliper body 833A via the shim 832H, the piston 832G, the nut 832F, and the bolt 832E. Consequently, the front caliper body 833B and the rear caliper body 833A move in the frontward direction "f" with respect to the caliper base 835. As a result, as shown in FIG. 14, the pad 831B comes into contact with the rear surface of the plate 82. According to the operation explained above, the caliper 83 changes from the unlocked state to the locked state.

Note that, when the caliper 83 changes from the locked state to the unlocked state, the elements explained above move in the opposite direction of the direction in which the elements move when the caliper changes from the unlocked state to the locked state. Since the moving direction of the movements of the elements is only reversed, further explanation of the movements is omitted.

Figure 15:
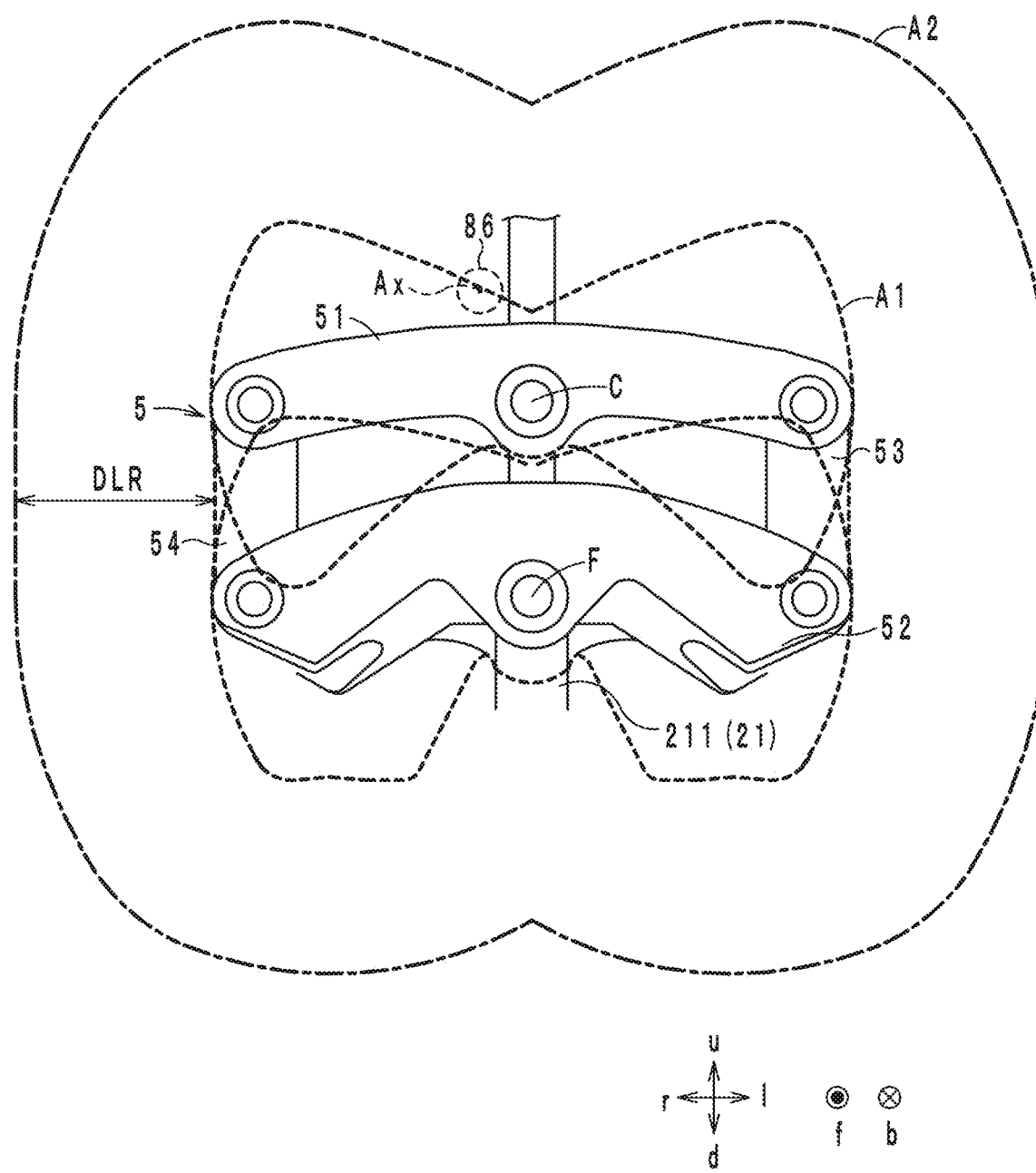
FIG. 15 is a diagram showing a positional relationship between a movable region A1 of an upper cross member 51, a lower cross member 52, a left side member 53, and a right side member 54, and the electric motor 86.
Figure 16:
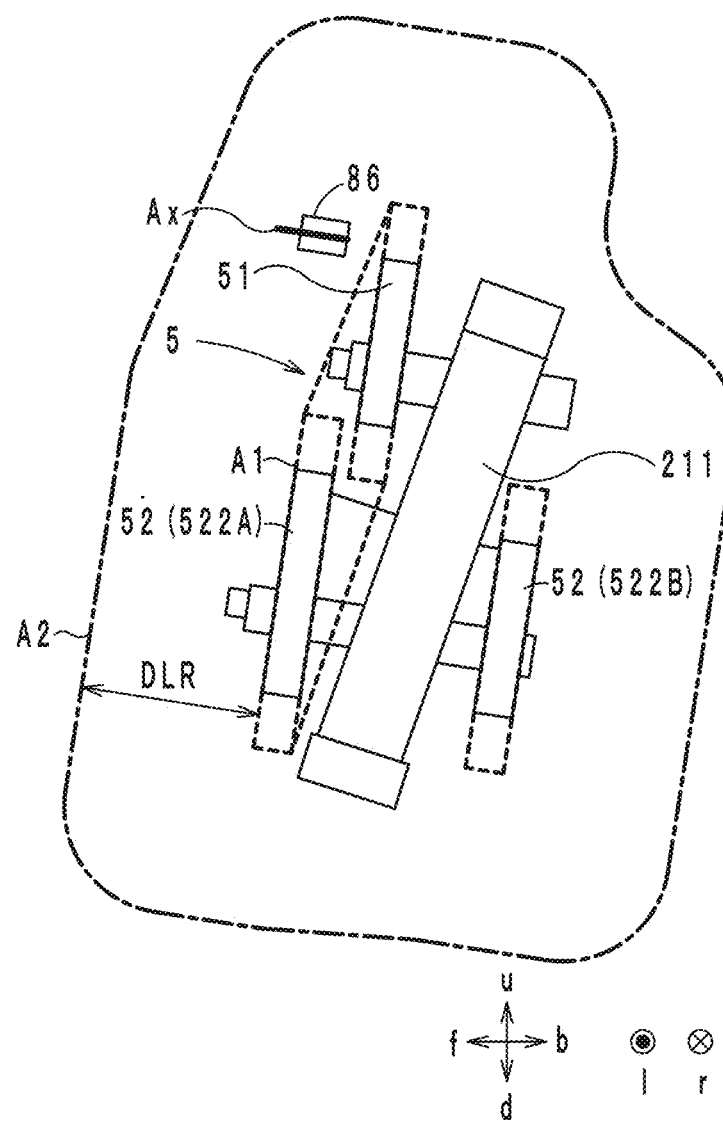
FIG. 16 is a diagram showing a positional relationship between the movable region A1 of the upper cross member 51, the lower cross member 52, the left side member 53, and the right side member 54, and the electric motor 86.

The position of the electric motor 86 is explained with reference to the drawings. FIG. 15 and FIG. 16 are diagrams showing a positional relationship between a movable region A1 of the upper cross member 51, the lower cross member 52, the left side member 53, and the right side member 54 and the electric motor 86. FIG. 15 is a view of the movable region A1 and the electric motor 86 viewed from the front "F". FIG. 16 is a view of the movable region A1 and the electric motor 86 viewed from the left "l".

First, the movable region A1 is explained. A state in which the left front wheel 31 is located in the uppermost end "u" in a movable region of the left front wheel 31 (not shown in the figure) and the right front wheel 32 is located in the lowermost end "d" in a movable region of the right front wheel (not shown in the figure) as shown in FIG. 7 is referred to as the maximum left leaning state. A state in which the left front wheel 31 is located in the lowermost end "d" in the movable region of the left front wheel 31 and the right front wheel 32 is located in the uppermost end "u" in the movable region of the right front wheel 32 as shown in FIG. 8 is referred to as the maximum right leaning state. The movable region A1 defines a region where the upper cross member 51, the lower cross member 52, the left side member 53, and the right side member 54 move through when the linkage 5 changes from the maximum left leaning state to the maximum right leaning state (or when the linkage 5 changes from the maximum right leaning state to the maximum left leaning state).

As shown in FIG. 15, when the movable region A1 is viewed from the front "F", the movable region A1 has a rectangular shape, the center of the upper side of which recesses in the downward direction "d" and the center of the lower side of which recesses in the upward direction "u". As shown in FIG. 16, when the movable region A1 is viewed from the left "l", the movable region A1 has a parallelogram shape. The upper cross member 51 rotates around the supporting section C. The supporting section C slightly leans in the upward direction "u" with respect to the front back direction "fb". Therefore, a movable region of the upper cross member 51 slightly leans in the backward direction "b" with respect to the up down direction "ud". Similarly, the lower cross member 52 rotates around the supporting section F. The supporting section F slightly leans in the upward direction "u" with respect to the front back direction fb. Therefore, a movable region of the lower cross member 52 slightly leans in the backward direction "b" with respect to the up down direction "ud". Consequently, as shown in FIG. 16, the movable region A1 slightly leans in the backward direction "b" with respect to the up down direction "ud".

In the maximum left leaning state shown in FIG. 7, a position where the pads 831A and 831B are opposed on the plate 82 is defined as a left leaning end portion position PL. In the maximum right leaning state shown in FIG. 8, a position where the pads 831A and 831B are opposed on the plate 82 is defined as a right leaning end portion position PR. When the linkage 5 is viewed from the front "F", the pads 831A and 831B define a rectangular shape. Therefore, when the linkage 5 is viewed from the front "F", the position of the center of gravity of the pad 831A in the maximum left leaning state shown in FIG. 7 is defined as the left leaning end portion position PL. When the linkage 5 is viewed from the front "F", the position of the center of gravity of the pad 831A in the maximum right leaning state shown in FIG. 8 is defined as the right leaning end portion position PR. Further, the distance between the left leaning end portion position PL and the right leaning end portion position PR is defined as a distance DLR.

The electric motor 86 is disposed near the movable region A1. Specifically, as shown in FIG. 15 and FIG. 16, a region, a distance to which from the movable region A1 is the distance DLR or less, is defined as a motor disposition region A2. As shown in FIG. 16, when the motor disposition region A2 is viewed from the left "l", the motor disposition region A2 has a rectangular shape cut off near a corner located in the backward direction "b" and the upward direction "u". In the vehicle body frame 21 in the upright state, the entire electric motor 86 is located in the motor disposition region A2. The electric motor 86 does not include an electric wire drawn out from a housing of the electric motor 86 to a housing outside and connected to components (e.g., a control board and a battery) other than the electric motor 86. Therefore, such an electric wire may be disposed outside the movable region A1.

In the vehicle body frame 21 in the upright state, the rotating shaft Ax of the electric motor 86 extends in the front back direction "fb" as shown in FIG. 16. The rotating shaft Ax extending in the front back direction "fb" means that the rotating shaft Ax is parallel to the front back direction "fb" and the rotating shaft Ax slightly leans in the up down direction "ud" with respect to the front back direction "fb". The rotating shaft Ax may lean within a range of about 10°, for example, in the up down direction "ud" with respect to the front back direction "fb".

Further, as shown in FIG. 16, in the vehicle body frame 21 in the upright state, at least a portion of the rotating shaft Ax of the electric motor 86 overlaps the movable region A1 when viewed from above "u". In more detail, the electric motor 86 is disposed above "u" the movable region A1. A rear portion of the electric motor 86 overlaps the movable region A1 when the electric motor 86 is viewed from above "u". Consequently, a rear portion of the rotating shaft Ax overlaps the movable region A1 when viewed from above "u". A front portion of the electric motor 86 defines the front half of the electric motor 86. The rear portion of the electric motor 86 defines the rear half of the electric motor 86. A front portion of the rotating shaft Ax defines the front half of the rotating shaft Ax. The rear portion of the rotating shaft Ax defines the rear half of the rotating shaft Ax.

With the leaning vehicle 1 explained above, it is possible to achieve a reduction in the size of the front portion of the leaning vehicle 1. In more detail, the resistance-force changer 8 includes the plate 82, the caliper 83, and the electric motor 86. The caliper 83 includes the pads 831A and 831B. The resistance-force changer 8 is configured such that the plate 82 and the pads 831A and 831B are relatively displaced in association with the relative displacement of the vehicle body frame 21 and the plurality of link members (the upper cross member 51, the lower cross member 52, the left side member 53, and the right side member 54). The resistance-force changer 8 operates the electric motor 86 to change a contact state of the pads 831A and 831B and the plate 82. Consequently, the resistance-force changer 8 changes a resistance force applied to the motion in which the vehicle body frame 21 and the plurality of link members are relatively displaced. In such a resistance-force changer 8, the pads 831A and 831B and the plate 82 are disposed near the linkage 5 to be capable of interlocking with the operation of the plurality of link members. The plate 82 moves with respect to the plurality of link members according to the operation of the linkage 5. A moving distance of the plate 82 with respect to the plurality of link members is the distance DLR between the left leaning end portion position PL and the right leaning end portion position PR. Therefore, when the pads 831A and 831B and the plate 82 are disposed near the linkage 5, the plate 82 is likely to move into the motor disposition region A2. The motor disposition region A2 defines a region spaced away from the movable region A1 of the plurality of link members by the distance equal to or smaller than the distance DLR between the left leaning end portion position PL and the right leaning end portion position PR. Therefore, in the vehicle body frame 21 in the upright state, the electric motor 86 is disposed in the motor disposition region A2. Consequently, the distance from the electric motor 86 to the pads 831A and 831B decreases. The transmission path of the driving force from the electric motor 86 to the pads 831A and 831B also decreases. Accordingly, less loss occurs in the driving force transmitted from the electric motor 86 to the pads 831A and 831B. As a result, it is possible to use the small electric motor 86. It is possible to achieve a reduction in the size of the front portion of the leaning vehicle 1.

The caliper 83 and the electric motor 86 are supported by the front frame 213. In the leaning vehicle 1, since the pads 831A and 831B and the electric motor 86 are close, the caliper 83 and the electric motor 86 are close. Consequently, a position where the caliper 83 is supported by the front frame 213 and a position where the electric motor 86 is supported by the front frame 213 are the same. Accordingly, a mechanism that supports the caliper 83 and the electric motor 86 with the front frame 213 is simplified. As a result, it is possible realize a reduction in the size of the front portion of the leaning vehicle 1.

When the caliper 83 and the electric motor 86 are close, a probability of the presence of structure between the pads 831A and 831B and the electric motor 86 decreases. Accordingly, it is less likely to have to complexly bend the transmission path of the driving force from the electric motor 86 to the pads 831A and 831B to avoid the structure present between the pads 831A and 831B and the electric motor 86. Accordingly, rather than a wire having flexibility, a plurality of rigid members are able to be used in the driving-force transmitter 832 that transmits the driving force generated by the electric motor 86 to the pads 831A and 831B. Specifically, the driving-force transmitter 832 includes the gear group 832A, which includes the plurality of rigid members, the arms 832B, 832C, and 832D, the bolt 832E, the nut 832F, the piston 832G, and the shims 832H and 832I. In the plurality of rigid members, less friction occurs compared with the wire. In the plurality of rigid members, less bending occurs compared with the wire. Therefore, a loss of a driving force that occurs in the plurality of rigid members is smaller than a loss of a driving force that occurs in the wire. Consequently, it is possible to use, in the leaning vehicle 1, the small electric motor 86 that generates a small torque. As a result, it is possible to achieve a reduction in the size of the front portion of the leaning vehicle 1.

With the leaning vehicle 1, in the leaning vehicle 1 including the linkage 5 of a so-called parallelogram link type, it is possible to achieve a reduction in the size of the front portion of the leaning vehicle 1.

Second Preferred Embodiment

Figure 17:
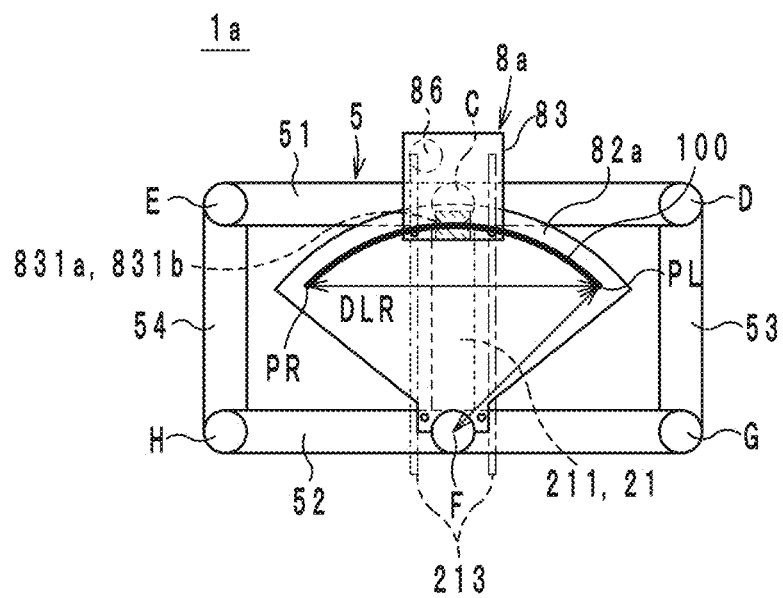
FIG. 17 is a view of a linkage 5 and a resistance-force changer 8a viewed from the front "f" in the vehicle body frame 21 in an upright state.

A leaning vehicle 1a according to a second preferred embodiment of the present invention is explained below with reference to the drawings. FIG. 17 is a view of the linkage 5 and a resistance-force changer 8a viewed from the front "F" in the vehicle body frame 21 in the upright state. FIG. 18 is a view of the linkage 5 and the resistance-force changer 8a viewed from the left "l" in the vehicle body frame 21 in the upright state.

The leaning vehicle 1a is different from the leaning vehicle 1 in the structure of the resistance-force changer 8a. Therefore, the structure of the resistance-force changer 8a is explained. Explanation is omitted about other structures.

The resistance-force changer 8a includes, as shown in FIG. 17, a plate 82a, the caliper 83, and the electric motor 86. The structures of the caliper 83 and the electric motor 86 of the resistance-force changer 8a are preferably the same as the structures of the caliper 83 and the electric motor 86 of the resistance-force changer 8. Therefore, explanation of these structures is omitted.

As shown in FIG. 17, the plate 82a has a fan shape when the resistance-force changer 8a is viewed from the front "F". The plate 82a is fixed to the lower cross member 52 in the supporting section F. The position of the supporting section F coincides with the position of the center of the fan shape of the plate 82a. Consequently, the vehicle body frame 21 leans in the left right direction "LR", such that the plate 82a is capable of rotating with respect to the head pipe 211 around the supporting section F together with the lower cross member 52.

The caliper 83 and the electric motor 86 (not shown in FIG. 18) are fixed to the front frame 213 as shown in FIG. 18. Consequently, the caliper 83 and the electric motor 86 cannot be displaced with respect to the head pipe 211. Therefore, the vehicle body frame 21 leans in the left right direction "LR", such that the caliper 83 is able to be displaced to define an arcuate track with respect to the plate 82a.

Figure 19:
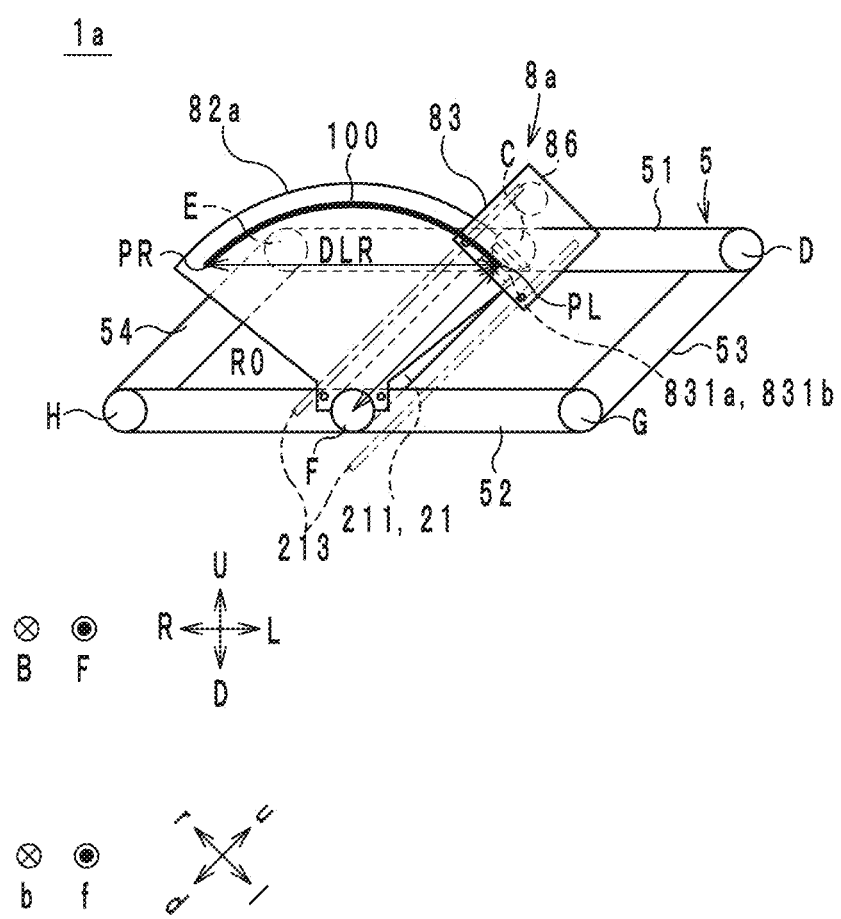
FIG. 19 is a view of the resistance-force changer 8a, which is viewed from the front "F", in a leaned state toward the left "L" of the vehicle body frame 21.
Figure 20:
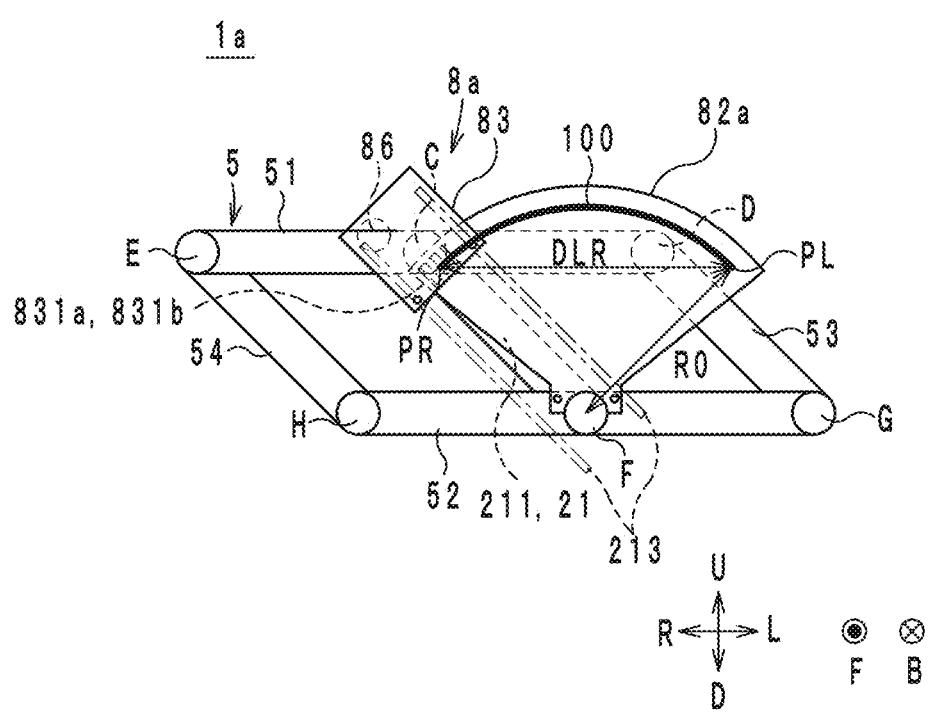
FIG. 20 is a view of the resistance-force changer 8a, which is viewed from the front "F", in a leaned state toward the rightward direction "R" of the vehicle body frame 21.

The operation of the resistance-force changer 8a is explained with reference to FIG. 19 and FIG. 20. FIG. 19 is a view of the resistance-force changer 8a, which is viewed from the front "F", in a leaned state to the left "L" of the vehicle body frame 21. FIG. 20 is a view of the resistance-force changer 8a, which is viewed from the front "F", in a leaned state to the rightward direction "R" of the vehicle body frame 21.

First, the operation of the resistance-force changer 8 at the time when the vehicle body frame 21 leans in leftward direction "L" is explained with reference to FIG. 19. As explained with reference to FIG. 5, when a rider leans the vehicle body frame 21 to the left "L", the head pipe 211 leans in leftward direction "L". When the head pipe 211 leans in leftward direction "L", when the leaning vehicle 1a is viewed from the front "F", the lower cross member 52 rotates counterclockwise with respect to the head pipe 211. The plate 82a is fixed to the lower cross member 52. On the other hand, the caliper 83 is fixed to the front frame 213. Therefore, as shown in FIG. 19, when the leaning vehicle 1 is viewed from the front "F", the caliper 83 rotates clockwise with respect to the plate 82.

The operation of the resistance-force changer 8 at the time when the vehicle body frame 21 leans in rightward direction "R" is explained with reference to FIG. 20. When the rider leans the vehicle body frame 21 to the rightward direction "R", the head pipe 211 leans in rightward direction "R". The lower cross member 52 rotates clockwise with respect to the head pipe 211. The plate 82a is fixed to the lower cross member 52. On the other hand, the caliper 83 is fixed to the front frame 213. Therefore, as shown in FIG. 20, when the leaning vehicle 1a is viewed from the front "F", the caliper 83 rotates counterclockwise with respect to the plate 82.

Incidentally, when the rider operates a not-shown switch provided in the handle 23 during a motion in which the plate 82a is displaced with respect to the caliper 83, the pads 831A and 831B respectively come into contact with the front surface and the rear surface of the plate 82a. Consequently, a frictional force is generated between the plate 82a and the pads 831A and 831B. A resistance force applied to the motion in which the plate 82a and the caliper 83 are relatively displaced increases. The plate 82a is fixed to the lower cross member 52. The caliper 83 is fixed to the front frame 213 (i.e., the head pipe 211). Therefore, when the resistance force applied to the motion in which the plate 82a and the caliper 83 are relatively displaced increases, a resistance force applied to a motion in which the lower cross member 52 rotates with respect to the head pipe 211 also increases. That is, a resistance force applied to a motion in which the upper cross member 51, the lower cross member 52, the left side member 53, and the right side member 54 and the vehicle body frame 21 are relatively displaced increases. As explained above, the resistance-force changer 8a changes a contact state of the pads 831A and 831B and the plate 82a to change a resistance force applied to a motion in which the vehicle body frame 21 and the plurality of link members (the upper cross member 51, the lower cross member 52, the left side member 53, and the right side member 54) are relatively displaced.

Incidentally, in a maximum left leaning state shown in FIG. 19, a position where the pads 831A and 831B are opposed on the plate 82a is defined as a left leaning end portion position PL. In a maximum right leaning state shown in FIG. 20, a position where the pads 831A and 831B are opposed on the plate 82a is defined as a right leaning end portion position PR. The vehicle body frame 21 leans in leftward direction "L" or rightward direction "R", such that the pads 831A and 831B are displaced with respect to the plate 82a to define an arcuate track 100 between the left leaning end portion position PL and the right leaning end portion position PR. The radius of the track 100 is represented as a radius R0. The radius R0 is desirably ¼ or more and ½ or less of the length of the upper cross member 51 in the left right direction "LR". The length of the upper cross member 51 in the left right direction "LR" is the distance from the left end to the right end of the upper cross member 51. The radius R0 satisfying such a condition is, for example, about 120 mm or more and about 200 mm or less.

In the leaning vehicle 1a explained above, it is possible to achieve a reduction in the size of the front portion of the leaning vehicle 1a because of the same reasons as the reasons for the leaning vehicle 1.

With the leaning vehicle 1a, it is possible to achieve a reduction in the size of the front portion of the leaning vehicle 1a because of the following reasons. In more detail, the length of the movable region A1 in the left right direction "LR" is relatively close to the length of the upper cross member 51 in the left right direction "LR". Therefore, in the leaning vehicle 1a, the radius R0 of the track 100 is set to ½ or less of the length of the upper cross member 51 in the left right direction "LR". Consequently, the length of the movable region A1 in the left right direction "LR" is equal to or less than the length of the track 100 in the left right direction "LR". For example, when the center in the left right direction "LR" of the track 100 is set close to the center in the left right direction of the movable region A1, it is easy to prevent the track 100 from easily protruding from the movable region A1 in the left right direction "LR". Accordingly, a reduction in the size of the front portion of the leaning vehicle 1a is achieved.

However, when the radius R0 of the track 100 decreases, it is desirable to increase the driving force generated by the electric motor 86 in order to generate a sufficient frictional force between the pads 831A and 831B and the plate 82a. However, when the driving force of the electric motor 86 is increased, the electric motor 86 is increased in size. Therefore, in the leaning vehicle 1a, the radius R0 of the track 100 is ¼ or more of the length of the upper cross member 51 in the left right direction "LR". Consequently, an increase in the size of the electric motor 86 is prevented. It is easy to prevent the arcuate track 100 from easily protruding from the movable region A1 in the left right direction "LR". Accordingly, a reduction in the size of the front portion of the leaning vehicle 1a is achieved.

Third Preferred Embodiment

Figure 21:
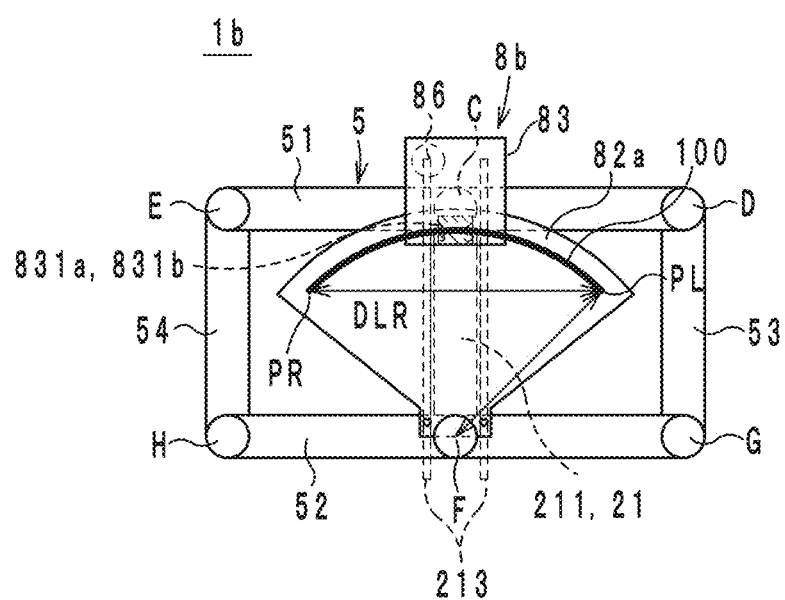
FIG. 21 is a view of the linkage 5 and the resistance-force changer 8a viewed from the front "f" of the vehicle body frame 21 in the upright state.
Figure 22:
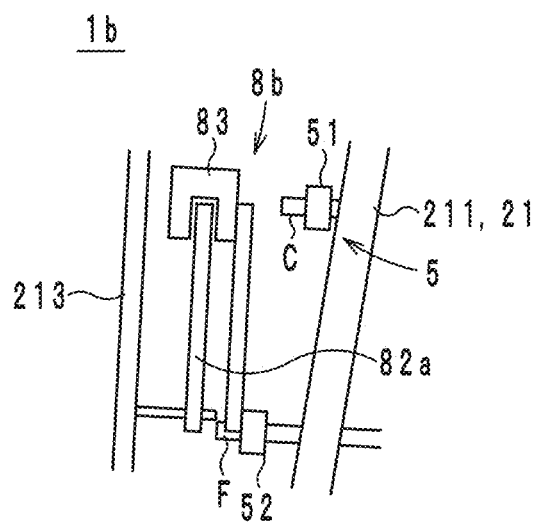
FIG. 22 is a view of the linkage 5 and the resistance-force changer 8a viewed from the left "l" of the vehicle body frame 21 in the upright state.

A leaning vehicle 1b according to a third preferred embodiment of the present invention is explained below with reference to FIG. 21 and FIG. 22. FIG. 21 is a view of the linkage 5 and a resistance-force changer 8b viewed from the front "F" in the vehicle body frame 21 in the upright state. FIG. 22 is a view of the linkage 5 and the resistance-force changer 8b viewed from the left "l" in the vehicle body frame 21 in the upright state.

The leaning vehicle 1b is different from the leaning vehicle 1a in the structure of the resistance-force changer 8b. Therefore, the structure of the resistance-force changer 8b is explained. Explanation of other structures is omitted.

Like the resistance-force changer 8a, the resistance-force changer 8b includes, as shown in FIG. 21, the plate 82a, the caliper 83, and the electric motor 86. The structures of the plate 82a, the caliper 83, and the electric motor 86 of the resistance-force changer 8b are respectively the same as the structures of the plate 82a, the caliper 83, and the electric motor 86 of the resistance-force changer 8a. However, whereas the plate 82a of the resistance-force changer 8a is fixed to the lower cross member 52, the plate 82a of the resistance-force changer 8b is fixed to the front frame 213 as shown in FIG. 22. Whereas the caliper 83 and the electric motor 86 of the resistance-force changer 8a are fixed to the front frame 213, the caliper 83 and the electric motor 86 of the resistance-force changer 8b are fixed to the lower cross member 52 as shown in FIG. 22. That is, the caliper 83 and the electric motor 86 are supported by the lower cross member 52. Therefore, in the leaning vehicle 1b, a position where the caliper 83 is supported in the lower cross member 52 and a position where the electric motor 86 is supported in the lower cross member 52 are the same. In the resistance-force changer 8b explained above, as in the resistance-force changer 8a, the caliper 83 is able to be displaced to define an arcuate track with respect to the plate 82a.

Figure 23:
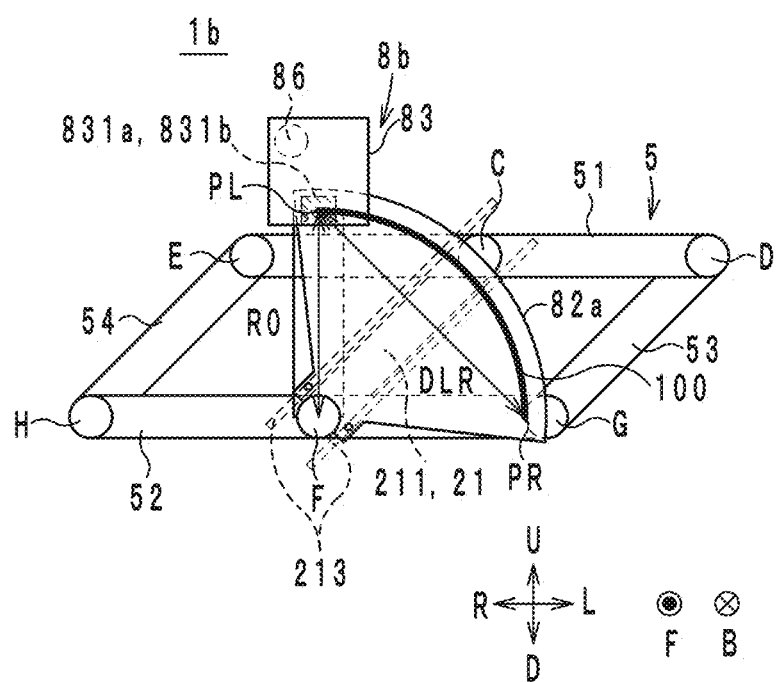
FIG. 23 is a view of the linkage 5 and the resistance-force changer 8a viewed from the front "f" of the vehicle body frame 21 leaning to the left "L".
Figure 24:
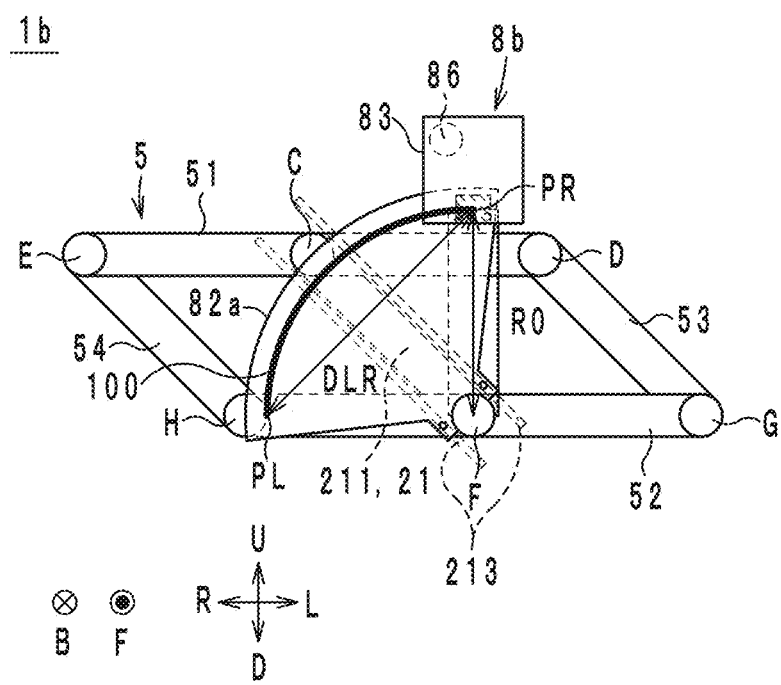
FIG. 24 is a view of the linkage 5 and the resistance-force changer 8a viewed from the front "F" in the vehicle body frame 21 leaning to the right "R".

The operation of the resistance-force changer 8b is explained with reference to FIG. 23 and FIG. 24. FIG. 23 is a view of the linkage 5 and the resistance-force changer 8b viewed from the front "F" in the vehicle body frame 21 leaning to the left "L". FIG. 24 is a view of the linkage 5 and the resistance-force changer 8b viewed from the front "F" in the vehicle body frame 21 leaning to the right "R".

First, the operation of the resistance-force changer 8b at the time when the vehicle body frame 21 leans in leftward direction "L" is explained with reference to FIG. 23. As explained with reference to FIG. 5, when a rider leans the vehicle body frame 21 to the left "L", the head pipe 211 leans in leftward direction "L". The plate 82a is fixed to the front frame 213. On the other hand, the caliper 83 is fixed to the lower cross member 52 in the supporting section F. Therefore, as shown in FIG. 23, when the leaning vehicle 1b is viewed from the front "F", the caliper 83 rotates counterclockwise with respect to the plate 82a.

The operation of the resistance-force changer 8b at the time when the vehicle body frame 21 leans in rightward direction "R" is explained with reference to FIG. 24. When the rider leans the vehicle body frame 21 to the right "R", the head pipe 211 leans in rightward direction "R". The plate 82a is fixed to the front frame 213. On the other hand, the caliper 83 is fixed to the lower cross member 52 in the supporting section F. Therefore, as shown FIG. 24, when the leaning vehicle 1b is viewed from the front "F", the caliper 83 rotates clockwise with respect to the plate 82.

Note that explanation of the operation of the resistance-force changer 8b is omitted because the operation is the same as the operation of the resistance-force changer 8a.

Note that, in the leaning vehicle 1b, because of the same reasons as the reasons for the leaning vehicle 1a, the radius R0 of the track 100 is desirably ¼ or more and ½ or less of the length of the upper cross member 51 in the left right direction "LR".

In the leaning vehicle 1b explained above, because of the same reasons as the reasons for the leaning vehicle 1a, it is possible to achieve a reduction in the size of the front portion of the leaning vehicle 1a.

Fourth Preferred Embodiment

Figure 25:
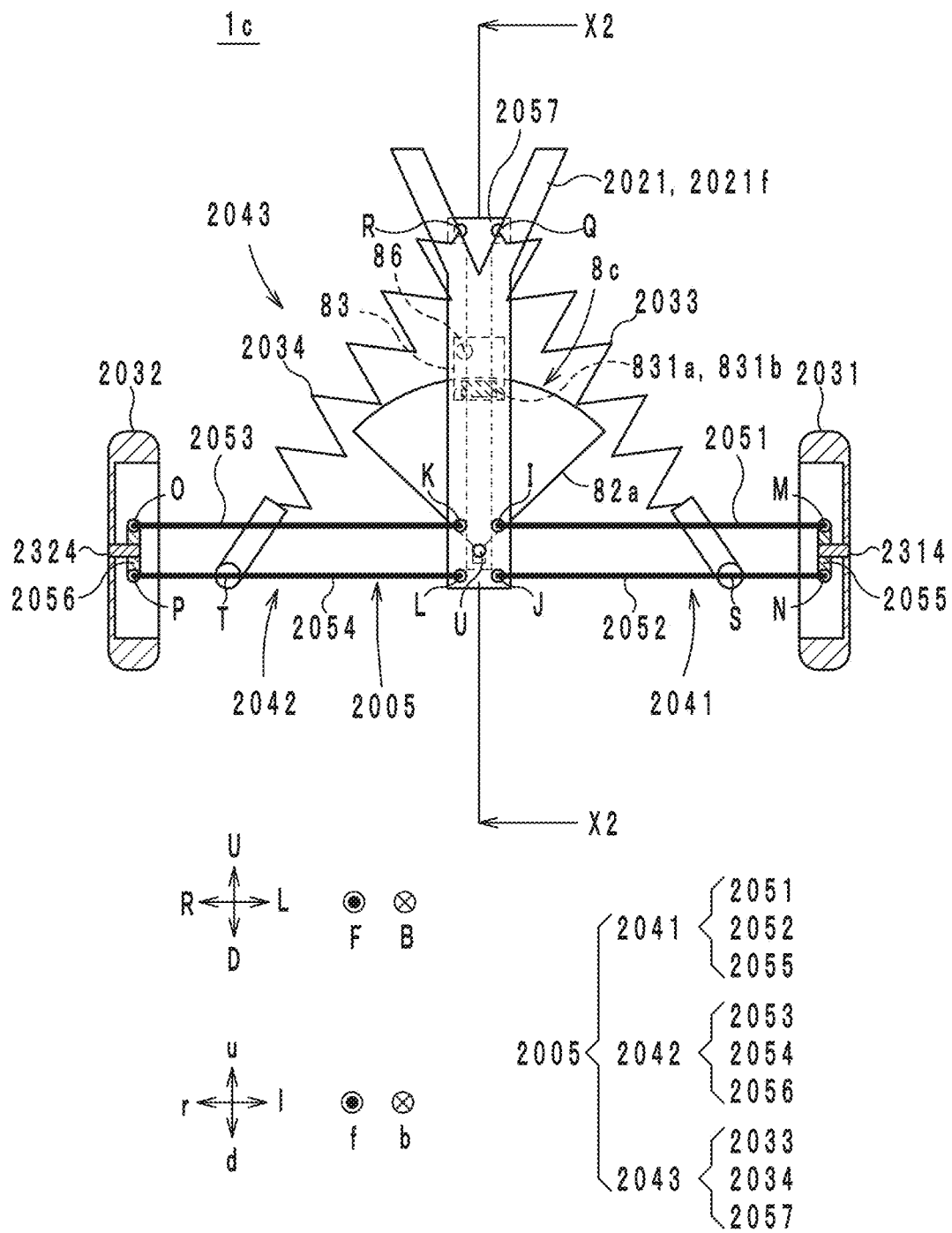
FIG. 25 is a view of a leaning vehicle 1c viewed from the front "F".

A leaning vehicle 1c according to a fourth preferred embodiment of the present invention is explained with reference to FIG. 25 and FIG. 26. FIG. 25 is a view of the leaning vehicle 1c viewed from the front "F". In FIG. 25, only main components in the leaning vehicle 1c are shown. FIG. 26 is a view of the leaning vehicle 1c viewed from the leaning-vehicle (1c) left "L".

The leaning vehicle 1c includes, as shown in FIG. 25, a vehicle body frame 2021, a left front wheel 2031, a right front wheel 2032, a rear wheel (not shown in the figure), and a linkage 2005.

The vehicle body frame 2021 leans in rightward direction "R" during a right turn. The vehicle body frame 2021 leans in leftward direction "L" during a left turn. The vehicle body frame 2021 supports a steering mechanism, a seat, a power unit, and the like not shown in the figure. In FIG. 25, a front portion (hereinafter, frame front portion 2021f) of the vehicle body frame 2021 is shown. The frame front portion 2021f extends in the up down direction "ud" in the front portion of the leaning vehicle 1c.

The linkage 2005 defines a linkage of a double wishbone type. The linkage 2005 is supported by the frame front portion 2021f. The linkage 2005 includes a left arm mechanism 2041, a right arm mechanism 2042, and a buffer 2043.

The left arm mechanism 2041 includes an upper-left arm member 2051, a lower-left arm member 2052, and a left knuckle 2055. When the leaning vehicle 1c is viewed from the front "F", the upper-left arm member 2051 extends in the left right direction "LR". The upper-left arm member 2051 is supported by the vehicle body frame 2021 in the supporting section I. The supporting section I is located in a right portion of the upper-left arm member 2051 and a lower portion of the frame front portion 2021f. A left portion of the upper-left arm member 2051 defines the left half of the upper-left arm member 2051. The right portion of the upper-left arm member 2051 defines the right half of the upper-left arm member 2051. The lower portion of the frame front portion 2021f defines the lower half of the frame front portion 2021f. An upper portion of the frame front portion 2021f defines the upper half of the frame front portion 2021f. The supporting section I includes a shaft extending in the front back direction "fb". The upper-left arm member 2051 is capable of rotating with respect to the frame front portion 2021f around the supporting section I. That is, the upper-left arm member 2051 is able to swing in the upward direction "u" and the downward direction "d" with respect to the frame front portion 2021f.

When the leaning vehicle 1c is viewed from the front "F", the lower-left arm member 2052 extends in the left right direction "LR". The lower-left arm member 2052 is disposed farther in the downward direction "D" than the upper-left arm member 2051. The lower-left arm member 2052 is supported by the frame front portion 2021f in the supporting section J. The supporting section J is located in a right portion of the lower-left arm member 2052 and the lower portion of the frame front portion 2021f. A left portion of the lower-left arm member 2052 defines the left half of the lower-left arm member 2052. A right portion of the lower-left arm member 2052 defines the right half of the lower-left arm member 2052. The supporting section J is located in the downward direction D of the supporting section I. The supporting section J includes a shaft extending in the front back direction "fb". The lower-left arm member 2052 is capable of rotating with respect to the frame front portion 2021f around the supporting section J. That is, the lower-left arm member 2052 is able to swing in the upward direction "u" and the downward direction "d" with respect to the frame front portion 2021f.

The left knuckle 2055 (an example of a left coupling member) is coupled to the left portion of the upper-left arm member 2051 and the left portion of the lower-left arm member 2052. The left knuckle 2055 is supported by the upper-left arm member 2051 in a supporting section M. The supporting section M is located in an upper portion of the left knuckle 2055 and the left portion of the lower-left arm member 2052. The upper portion of the left knuckle 2055 defines the upper half of the left knuckle 2055. A lower portion of the left knuckle 2055 defines the lower half of the left knuckle 2055. The supporting section M includes a shaft extending in the front back direction "fb". The left knuckle 2055 is capable of rotating with respect to the upper-left arm member 2051 around the supporting section M.

Further, the left knuckle 2055 is supported by the lower-left arm member 2052 in a supporting section N. The supporting section N is located in the lower portion of the left knuckle 2055 and the left portion of the lower-left arm member 2052. The supporting section N includes a shaft extending in the front back direction "fb". The left knuckle 2055 is capable of rotating with respect to the lower-left arm member 2052 around the supporting section N. Consequently, when the vehicle body frame 2021 leans in leftward direction "L", the left knuckle 2055 leans in leftward direction "L" while keeping a parallel state with the frame front portion 2021f. When the vehicle body frame 2021 leans in rightward direction "R", the left knuckle 2055 leans in rightward direction "R" while keeping the parallel state with the frame front portion 2021f.

The left knuckle 2055 supports the left front wheel 2031. The left front wheel 2031 rotates around a left front wheel axle 2314. The left front wheel axle 2314 extends in the left right direction "lr". Consequently, when the vehicle body frame 2021 leans in leftward direction "L", the left front wheel 2031 leans in leftward direction "L" together with the left knuckle 2055. When the vehicle body frame 2021 leans in rightward direction "R", the left front wheel 2031 leans in rightward direction "R" together with the left knuckle 2055.

The left arm mechanism 2041 explained above swings in the upward direction "u" when the vehicle body frame 2021 leans in leftward direction "L". The left arm mechanism 2041 swings in the downward direction "d" when the vehicle body frame 2021 leans in rightward direction "R".

The right arm mechanism 2042 includes an upper-right arm member 2053, a lower-right arm member 2054, and a right knuckle 2056. When the leaning vehicle 1c is viewed from the front "F", the upper-right arm member 2053 extends in the left right direction "LR". The upper-right arm member 2053 is supported by the frame front portion 2021f in the supporting section K. The supporting section K is located in a left portion of the upper-right arm member 2053 and the lower portion of the frame front portion 2021f. The left portion of the upper-right arm member 2053 defines the left half of the upper-right arm member 2053. A right portion of the upper-right arm member 2053 defines the right half of the upper-right arm member 2053. The supporting section K includes a shaft extending in the front back direction "fb". The upper-right arm member 2053 is capable of rotating with respect to the frame front portion 2021f around the supporting section K. That is, the upper-right arm member 2053 is able to swing in the upward direction "u" and the downward direction "d" with respect to the frame front portion 2021f.

When the leaning vehicle 1c is viewed from the front "F", the lower-right arm member 2054 extends in the left right direction "LR". The lower-right arm member 2054 is disposed farther in the downward direction "D" than the upper-right arm member 2053. The lower-right arm member 2054 is supported by the frame front portion 2021f in a supporting section L. The supporting section L is located in a left portion of the lower-right arm member 2054 and the lower portion of the frame front portion 2021f. The supporting section L is located below the supporting section K. The left portion of the lower-right arm member 2054 defines the left half of the lower-right arm member 2054. A right portion of the lower-right arm member 2054 defines the right half of the lower-right arm member 2054. The supporting section L includes a shaft extending in the front back direction "fb". The lower-right arm member 2054 is capable of rotating with respect to the frame front portion 2021f around the supporting section L. That is, the lower-right arm member 2054 is able to swing in the upward direction "u" and the downward direction "d" with respect to the frame front portion 2021f.

The right knuckle 2056 (an example of a right coupling member) is coupled to the right portion of the upper-right arm member 2053 and the right portion of the lower-right arm member 2054. The right knuckle 2056 is supported by the upper-right arm member 2053 in a supporting section O. The supporting section O is located in an upper portion of the right knuckle 2056 and the right portion of the upper-right arm member 2053. The upper portion of the right knuckle 2056 defines the upper half of the right knuckle 2056. A lower portion of the right knuckle 2056 defines the lower half of the right knuckle 2056. The supporting section O includes a shaft extending in the front back direction "fb". The right knuckle 2056 is capable of rotating with respect to the upper-right arm member 2053 around the supporting section O.

Further, the right knuckle 2056 is supported by the upper-right arm member 2053 in a supporting section P. The supporting section P is located in the lower portion of the right knuckle 2056 and the right portion of the lower-right arm member 2054. The supporting section P includes a shaft extending in the front back direction "fb". The right knuckle 2056 is capable of rotating with respect to the lower-right arm member 2054 around the supporting section P. Consequently, when the vehicle body frame 2021 leans in leftward direction "L", the right knuckle 2056 leans in leftward direction "L" while keeping a parallel state with the frame front portion 2021f. When the vehicle body frame 2021 leans in rightward direction "R", the right knuckle 2056 leans in rightward direction "R" while keeping the parallel state with the frame front portion 2021f.

The right knuckle 2056 supports the right front wheel 2032. The right front wheel 2032 rotates around the right front wheel axle 2324. The right front wheel axle 2324 extends in the left right direction "lr". Consequently, when the vehicle body frame 2021 leans in leftward direction "L", the right front wheel 2032 leans in leftward direction "L" together with the right knuckle 2056. When the vehicle body frame 2021 leans in rightward direction "R", the right front wheel 2032 leans in rightward direction "R" together with the right knuckle 2056.

The right arm mechanism 2042 explained above swings to the downward direction "d" when the vehicle body frame 2021 leans in leftward direction "L". The right arm mechanism 2042 swings in the upward direction "u" when the vehicle body frame 2021 leans in rightward direction "R".

The buffer 2043 couples the left arm mechanism 2041 and the right arm mechanism 2042 and performs a buffering action. The buffer 2043 includes a left buffer 2033, a right buffer 2034, and a suspension tower 2057.

As shown in FIG. 26, the suspension tower 2057 is disposed behind "B" the frame front portion 2021f. The suspension tower 2057 extends in the up down direction "UD" in the leaning vehicle 1c in the upright state. The suspension tower 2057 is supported by the frame front portion 2021f in a supporting section U. The supporting section U is located in a lower portion of the suspension tower 2057 and the lower portion of the frame front portion 2021f. An upper portion of the suspension tower 2057 defines the upper half of the suspension tower 2057. The lower portion of the suspension tower 2057 defines the lower half of the suspension tower 2057. The supporting section U includes a shaft extending in the front back direction "fb". The suspension tower 2057 is capable of rotating with respect to the frame front portion 2021f around the supporting section U.

The left buffer 2033 includes a combination of a spring and a damper. The left buffer 2033 extends and contracts in the longitudinal direction of the left buffer 2033. The left buffer 2033 linearly extends from the upper end portion of the suspension tower 2057 toward the leftward direction "L" and the downward direction "D" in the vehicle body frame 2021 in the upright state. The left buffer 2033 is supported by the suspension tower 2057 in a supporting section Q. The supporting section Q is located at the upper end portion of the left buffer 2033 and the upper end portion of the suspension tower 2057. The supporting section Q includes a shaft extending in the front back direction "fb". The left buffer 2033 is capable of rotating with respect to the suspension tower 2057 around the supporting section Q.

The left buffer 2033 is supported by the lower-left arm member 2052 in a supporting section S. The supporting section S is located at the lower end portion of the left buffer 2033 and the left portion of the lower-left arm member 2052. The supporting section S includes a shaft extending in the front back direction "fb". The left buffer 2033 is capable of rotating with respect to the lower-left arm member 2052 around the supporting section S.

The right buffer 2034 includes a combination of a spring and a damper. The right buffer 2034 extends and contracts in the longitudinal direction of the right buffer 2034. The right buffer 2034 linearly extends from the upper end portion of the suspension tower 2057 toward the rightward direction "R" and the downward direction "D" in the vehicle body frame 2021 in the upright state. The right buffer 2034 is supported by the suspension tower 2057 in a supporting section R. The supporting section R is located at the upper end portion of the right buffer 2034 and the upper end portion of the suspension tower 2057. The supporting section R includes a shaft extending in the front back direction "fb". The right buffer 2034 is capable of rotating with respect to the suspension tower 2057 around the supporting section R.

The right buffer 2034 is supported by the lower-right arm member 2054 in a supporting section T. The supporting section T is located at the lower end portion of the right buffer 2034 and the right portion of the lower-right arm member 2054. The supporting section T includes a shaft extending in the front back direction "fb". The right buffer 2034 is capable of rotating with respect to the lower-right arm member 2054 around the supporting section T.

Figure 27:
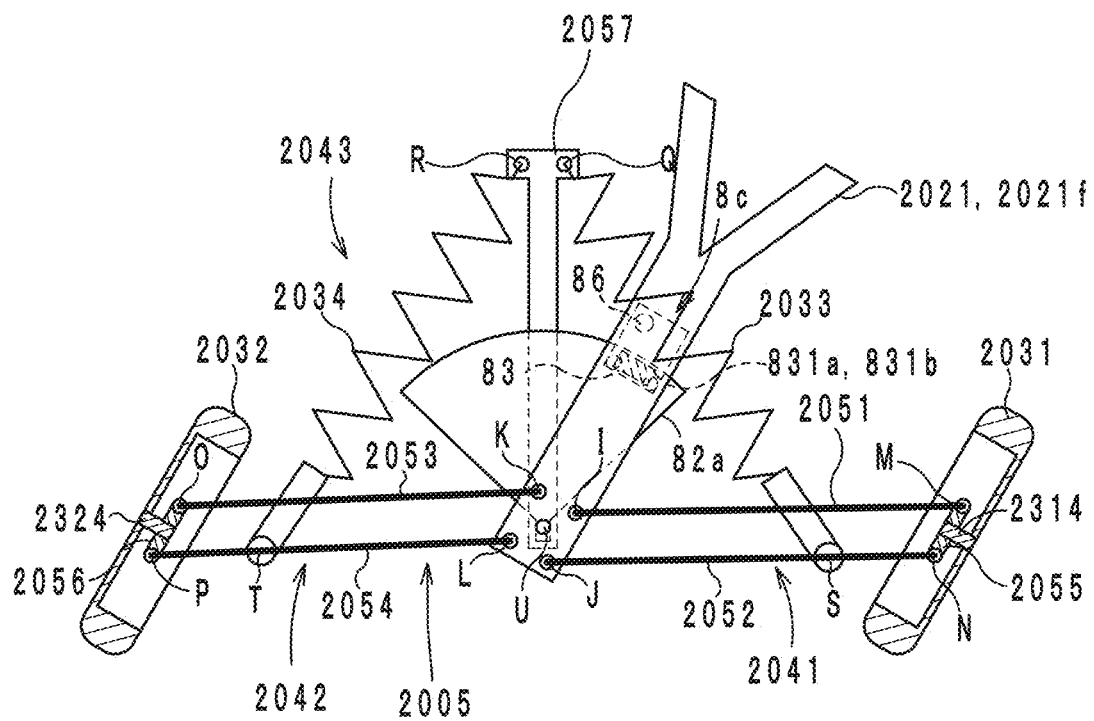
FIG. 27 is a view of a front portion of the leaning vehicle 1c, which is viewed from the front "F", in a leaned state toward the left "L".

A leaning motion of the leaning vehicle 1c is explained with reference to FIG. 27. FIG. 27 is a view of the front portion of the leaning vehicle 1c in a leaned state to the left "L" viewed from the front "F".

As shown in FIG. 27, the linkage 2005 leans the vehicle body frame 2021 to the left "L" during a left turn by displacing the upper-left arm member 2051, the lower-left arm member 2052, the upper-right arm member 2053, and the lower-right arm member 2054 with respect to the vehicle body frame 2021 such that the left front wheel axle 2314 is located farther in the upward direction "u" than the right front wheel axle 2324. The linkage 2005 leans the vehicle body frame 2021 to the right "R" during a right turn by displacing the upper-left arm member 2051, the lower-left arm member 2052, the upper-right arm member 2053, and the lower-right arm member 2054 with respect to the vehicle body frame 2021 such that the right front wheel axle 2324 is located farther in the upward direction "u" than the left front wheel axle 2314. In the following explanation, an example is explained in which the vehicle body frame 2021 leans in leftward direction "L".

When the rider leans the vehicle body frame 2021 to the left "L", the frame front portion 2021f leans in leftward direction "L". When the frame front portion 2021f leans in leftward direction "L", the left arm mechanism 2041 swings in the upward direction "u". When the left arm mechanism 2041 swings in the upward direction "u", the left knuckle 2055 is displaced in the upward direction "u" while keeping the parallel state with the frame front portion 2021f. Therefore, the left knuckle 2055 leans in leftward direction "L" together with the vehicle body frame 2021. As a result, the left front wheel 2031 leans in leftward direction "L" together with the left knuckle 2055.

When the frame front portion 2021f leans in leftward direction "L", the right arm mechanism 2042 swings in the downward direction "d". When the right arm mechanism 2042 swings in the downward direction "d", the right knuckle 2056 is displaced to the downward direction "d" while keeping the parallel state with the frame front portion 2021f. Therefore, the right knuckle 2056 leans in leftward direction "L" together with the vehicle body frame 2021. As a result, the right front wheel 2032 leans in leftward direction "L" together with the right knuckle 2056.

However, the left buffer 2033 and the right buffer 2034 maintain their length at the time when the vehicle body frame 2021 is in the upright state (i.e., length shown in FIG. 25). Therefore, the suspension tower 2057 does not lean in leftward direction "L" and extends in the up down direction "UD".

Note that, when the vehicle body frame 2021 leans in rightward direction "R", the elements explained above rotate in the opposite direction of the direction in which the elements rotate when the vehicle body frame 2021 leans in leftward direction "L". Since the movements of the elements are only reversed in the left and the right, further explanation of the movements is omitted.

A resistance-force changer 8c is explained with reference to FIG. 25 to FIG. 27.

The leaning vehicle 1c includes the resistance-force changer 8c as shown in FIG. 25. The resistance-force changer 8c changes a resistance force applied to a motion in which the vehicle body frame 2021 and the plurality of link members (the upper-left arm member 2051, the lower-left arm member 2052, the upper-right arm member 2053, and the lower-right arm member 2054) are relatively displaced.

As shown in FIG. 26, the resistance-force changer 8c is provided behind "b" the frame front portion 2021f and in front "f" of the suspension tower 2057.

The resistance-force changer 8c includes, as shown in FIG. 25, the plate 82a, the caliper 83, and the electric motor 86. The structures of the plate 82a, the caliper 83, and the electric motor 86 of the resistance-force changer 8c are the same as the structures of the plate 82a, the caliper 83, and the electric motor 86 of resistance-force changer 8a.

The plate 82a has a fan shape when the resistance-force changer 8a is viewed from the front "F". As shown in FIG. 26, the plate 82a is fixed to the suspension tower 2057 in the supporting section U. As shown in FIG. 25, the position of the supporting section U coincides with the position of the center of the fan shape of the plate 82a.

As shown in FIG. 26, the caliper 83 and the electric motor 86 (not shown in FIG. 26) are fixed to the frame front portion 2021f. The frame front portion 2021f is capable of rotating around the supporting section U with respect to the suspension tower 2057. Therefore, the caliper 83 is displaced to define an arcuate track with respect to the plate 82a. Note that the structures of the caliper 83 and the electric motor 86 of the resistance-force changer 8c are the same as the structures of the caliper 83 and the electric motor 86 of the resistance-force changer 8a. Therefore, further explanation of the structures is omitted.

Figure 28:
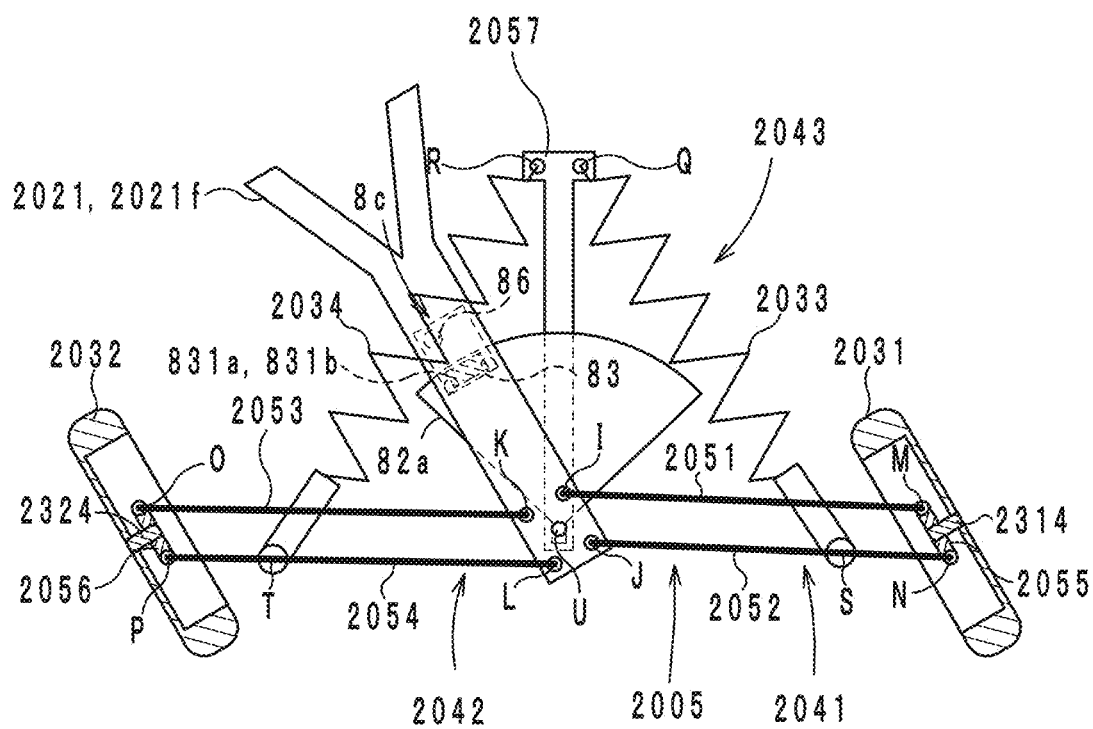
FIG. 28 is a view of the front portion of the leaning vehicle 1c, which is viewed from the front "F", in a leaned state toward the rightward direction "R".

The operation of the resistance-force changer 8c is explained with reference to FIG. 27 and FIG. 28. FIG. 28 is a view of the front portion of the leaning vehicle 1c in a leaned state to the rightward direction "R" viewed from the front "F".

First, the operation of the resistance-force changer 8 at the time when the vehicle body frame 2021 leans in leftward direction "L" is explained with reference to FIG. 27. When the rider leans the vehicle body frame 2021 to the left "L", the frame front portion 2021f leans in leftward direction "L". The plate 82a is fixed to the suspension tower 2057. On the other hand, the caliper 83 is fixed to the frame front portion 2021f. Therefore, as shown in FIG. 27, when the leaning vehicle 1 is viewed from the front "F", the caliper 83 rotates clockwise with respect to the plate 82a.

The operation of the resistance-force changer 8c at the time when the vehicle body frame 2021 leans in rightward direction "R" is explained with reference to FIG. 28. When the rider leans the vehicle body frame 2021 to the rightward direction "R", the frame front portion 2021f leans in rightward direction "R". The plate 82a is fixed to the suspension tower 2057. On the other hand, the caliper 83 is fixed to the frame front portion 2021f. Therefore, as shown in FIG. 28, when the leaning vehicle 1c is viewed from the front "F", the caliper 83 rotates counterclockwise with respect to the plate 82a.

Incidentally, when the rider operates a not-shown switch provided in the handle 23 during a motion in which the plate 82a is displaced with respect to the caliper 83, the pads 831A and 831B respectively come into contact with the front surface and the rear surface of the plate 82a. Consequently, a frictional force is generated between the plate 82a and the pads 831A and 831B. A resistance force applied to the motion in which the plate 82a and the caliper 83 are relatively displaced increases. The plate 82a is fixed to the suspension tower 2057. The caliper 83 is fixed to the frame front portion 2021f. Therefore, when the resistance force applied to the motion in which the plate 82a and the caliper 83 are relatively displaced increases, a resistance force applied to a motion in which the frame front portion 2021f rotates with respect to the suspension tower 2057 also increases. That is, a resistance force applied to a motion in which the upper-left arm member 2051, the lower-left arm member 2052, the upper-right arm member 2053, and the lower-right arm member 2054 and the vehicle body frame 2021 are relatively displaced increases. As explained above, the resistance-force changer 8c changes a contact state of the pads 831A and 831B and the plate 82a to change a resistance force applied to a motion in which the vehicle body frame 2021 and the plurality of link members (the upper-left arm member 2051, the lower-left arm member 2052, the upper-right arm member 2053, and the lower-right arm member 2054) are relatively displaced.

In the leaning vehicle 1c explained above, it is possible to achieve a reduction in the size of the front portion of the leaning vehicle 1c because of the same reasons as the reasons for the leaning vehicle 1a.

Other Preferred Embodiments

The preferred embodiments described above or shown in the figures are intended to facilitate understanding of the present disclosure and do not limit the idea of the present disclosure. The preferred embodiments can be changed and improved without departing from the gist of the preferred embodiments.

The gist includes equivalent elements, corrections, deletions, combinations (e.g., combinations of the characteristics described in the various preferred embodiments), improvements, and changes that can be recognized by those skilled in the art on the basis of the example preferred embodiments disclosed in this specification. The limitations in the claims should be broadly interpreted on the basis of the terms used in the claims and should not be limited to the preferred embodiments described in this specification or the prosecution of this application. Such preferred embodiments should be interpreted as nonexclusive. For example, in this specification, the terms "preferably" and "desirable" are nonexclusive and means that "preferably but not limited to this" and "desirable but not limited to this".

Note that, in the leaning vehicle 1c, the plate 82a may be fixed to the frame front portion 2021f. The caliper 83 and the electric motor 86 may be fixed to the suspension tower 2057.

Note that, in the leaning vehicles 1, 1a, 1b, and 1c, the driving-force transmitter 832 of the caliper 83 preferably transmits the driving force of the electric motor 86 to the bolt 832E with the gear group 832A and the arms 832B, 832C, and 832D. However, the driving-force transmitter 832 may transmit the driving force of the electric motor 86 to the bolt 832E only with the gear group without using the arms. The driving-force transmitter 832 may transmit the driving force of the electric motor 86 to the bolt 832E only with the arms without using the gear group.

In the leaning vehicles 1, 1a, and 1b described above, the resistance-force changers 8, 8a, 8a, and 8b change the resistance force applied to the motion in which the vehicle body frame 21 and the plurality of link members (the upper cross member 51, the lower cross member 52, the left side member 53, and the right side member 54) are relatively displaced. In order to realize such operation, the resistance-force changers 8, 8a, and 8b change the resistance force applied to the motion in which the lower cross member 52 rotates with respect to the head pipe 211. However, the resistance-force changers 8, 8a, and 8b may change a resistance force applied to a motion in which the upper cross member 51 rotates with respect to the head pipe 211. The resistance-force changers 8, 8a, and 8b may change a resistance force applied to a motion in which the left side member 53 or the right side member 54 is displaced in the up down direction "ud" with respect to the head pipe 211. The resistance-force changers 8, 8a, and 8b may change a resistance force applied to a motion in which at least two members among the upper cross member 51, the lower cross member 52, the left side member 53, and the right side member 54 are relatively displaced.

In the leaning vehicle 1c, the resistance-force changer 8c preferably changes the resistance force applied to the motion in which the vehicle body frame 2021 and the plurality of link members (the upper-left arm member 2051, the lower-left arm member 2052, the upper-right arm member 2053, and the lower-right arm member 2054) are relatively displaced. In order to realize such operation, the resistance-force changer 8c changes the resistance force applied to the motion in which the frame front portion 2021f rotates with respect to the suspension tower 2057. However, the resistance-force changer 8c may change a resistance force applied to a motion in which the upper-left arm member 2051 and the lower-left arm member 2052 swing in the up down direction "ud" with respect to the vehicle body frame 2021 and may change a resistance force applied to a motion in which the upper-right arm member 2053 and the lower-right arm member 2054 swing in the up down direction "ud" with respect to the vehicle body frame 2021.

In the leaning vehicle 1c, the buffer 2043 preferably couples the left arm mechanism 2041 and the right arm mechanism 2042. The buffer 2043 couples the lower-left arm member 2052 and the lower-right arm member 2054 via the left buffer 2033, the suspension tower 2057, and the right buffer 2034. However, the buffer 2043 may couple the left arm mechanism 2041 and the right arm mechanism 2042 using other coupling methods. For example, the buffer 2043 may couple the upper-left arm member 2051 and the upper-right arm member 2053 via the left buffer 2033, the suspension tower 2057, and the right buffer 2034. The buffer 2043 may couple the lower-left arm member 2052 and the lower-right arm member 2054 not via the suspension tower 2057. The buffer 2043 may couple the upper-left arm member 2051 and the upper-right arm member 2053 not via the suspension tower 2057.

Each of the leaning vehicles 1, 1a, 1b, and 1c described above preferably includes one rear wheel. However, the leaning vehicle may include a plurality of rear wheels.

In the leaning vehicles 1, 1a, 1b, and 1c described above, the center in the left right direction "lr" of the rear wheel 4 preferably coincides with the center in the left right direction "lr" of the left front wheel 31 and the right front wheel 32. However, the center in the left right direction "lr" of the rear wheel 4 may not coincide with the center in the left right direction "lr" of the left front wheel 31 and the right front wheel 32.

In the leaning vehicles 1, 1a, and 1b described above, the upper cross member 51 is preferably a single tabular member. The lower cross member 52 includes the front lower cross member 522A and the rear lower cross member 522B. However, the upper cross member 51 may include a front upper cross member and a rear upper cross member. The lower cross member 52 may be a single tabular member. At least one of the upper cross member 51 and the lower cross member 52 may include a left tabular member supported by the head pipe 211 and the left side member 53 and a right tabular member supported by the head pipe 211 and the right side member 54.

In the leaning vehicles 1, 1a, and 1b described above, the handle 23 is preferably a single member extending in the left right direction "LR". However, if an input of a steering force to turn the left front wheel 31 and the right front wheel 32 is possible, the handle 23 may be separately provided with a left handle section operated by the left hand of the rider and a right handle section operated by the right hand of the rider.

In the leaning vehicles 1, 1a, and 1b described above, the linkage 5 may be supported by the head pipe 211 functioning as an example of the link support. However, the linkage 5 may be supported by a portion other than the head pipe 211 in the vehicle body frame 21.

In the leaning vehicle 1b described above, the caliper 83 is preferably supported by the lower cross member 52. However, in the leaning vehicle 1b, the caliper 83 only has to be supported by any one of the plurality of link members (the upper cross member 51, the lower cross member 52, the left side member 53, and the right side member 54).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A leaning vehicle comprising:
   a vehicle body frame that leans leftward during a left turn and leans rightward during a right turn;
   a left steerable wheel that rotates around a left steerable wheel axle;
   a right steerable wheel that rotates around a right steerable wheel axle;
   a linkage including a plurality of link members displaceable with respect to the vehicle body frame and supporting the left steerable wheel and the right steerable wheel, the linkage causing the vehicle body frame to lean leftward during the left turn by relatively displacing the vehicle body frame and the plurality of link members such that the left steerable wheel axle is located farther upward than the right steerable wheel axle, and the linkage causing the vehicle body frame to lean rightward during the right turn by relatively displacing the vehicle body frame and the plurality of link members such that the right steerable wheel axle is located farther upward than the left steerable wheel axle; and
   a resistance-force changer including an electric motor, a first frictional-member driver, and a second frictional-member, the first frictional-member driver including a driving-force transmitter and a first frictional member, the driving-force transmitter including one or more rigid members that transmit a driving force generated by the electric motor to the first frictional member, the resistance-force changer causing the first frictional member and the second frictional member to relatively displace in association with the relative displacement of the vehicle body frame and the plurality of link members, the resistance-force changer operating the electric motor and the driving-force transmitter to change a contact state of the first frictional member and the second frictional member to change a resistance force applied during the relative displacement of the vehicle body frame and the plurality of link members; wherein
   a left leaning end portion position defines a position where the first frictional member is opposed to the second frictional member when the left steerable wheel is located uppermost in a movable region of the left steerable wheel and the right steerable wheel is located lowermost in a movable region of the right steerable wheel, and a right leaning end portion position defines a position where the first frictional member is opposed to the second frictional member when the left steerable wheel is located lowermost in the movable region of the left steerable wheel and the right steerable wheel is located uppermost in the movable region of the right steerable wheel;
   with the vehicle body frame in an upright state, an entirety of the electric motor is disposed in a motor disposition region spaced away from a movable region of the plurality of link members by a distance equal to or smaller than a distance between the left leaning end portion position and the right leaning end portion position; and
   the leaning vehicle includes a structure (A) or a structure (B):
      (A) the first frictional-member driver and the electric motor are supported by the vehicle body frame, and a position where the first frictional-member driver is supported in the vehicle body frame and a position where the electric motor is supported in the vehicle body frame are the same; or
      (B) the first frictional-member driver and the electric motor are supported by any one of the plurality of link members, and a position where the first frictional-member driver is supported in any one of the plurality of link members and a position where the electric motor is supported in any one of the plurality of link members are the same.

2. The leaning vehicle according to claim 1, wherein the linkage includes:
   an upper cross member disposed farther upward than the left steerable wheel and the right steerable wheel, and is rotatably supported by the vehicle body frame at an intermediate portion of the upper cross member;
   a lower cross member disposed farther downward than the upper cross member and farther upward than the left steerable wheel and the right steerable wheel, and is rotatably supported by the vehicle body frame at an intermediate portion of the lower cross member;
   a left side member rotatably supported by a left portion of the upper cross member in an upper portion of the left side member, and rotatably supported by a left portion of the lower cross member in a lower portion of the left side member; and
   a right side member rotatably supported by a right portion of the upper cross member in an upper portion of the right side member and rotatably supported by a right side of the lower cross member in a lower portion of the right side member;
   the left steerable wheel is supported by the left side member; and
   the right steerable wheel is supported by the right side member.

3. The leaning vehicle according to claim 2, wherein
   when the vehicle body frame leans in the leftward or the rightward direction the first frictional member is displaced with respect to the second frictional member and defines an arcuate track between the left leaning end portion position and the right leaning end portion position as the leaning vehicle is viewed from a front of the leaning vehicle; and
   a radius of the arcuate track is ¼ or more and ½ or less of a length of the upper cross member in a left-right direction.

4. The leaning vehicle according to claim 1, wherein the linkage includes:
- a left arm mechanism including an upper-left arm member rotatably supported by the vehicle body frame in a right portion of the upper-left arm member, a lower-left arm member disposed farther downward than the upper-left arm member and rotatably supported by the vehicle body frame in a right portion of the lower-left arm member, and a left coupling member coupled to a left portion of the upper-left arm member and a left portion of the lower-left arm member, and the left arm mechanism swings upward when the vehicle body frame leans leftward and swings downward when the vehicle body frame leans rightward;
- a right arm mechanism including an upper-right arm member rotatably supported by the vehicle body frame in a left portion of the upper-right arm member, a lower-right arm member disposed farther downward than the upper-right arm member and rotatably supported by the vehicle body frame in a left portion of the lower-right arm member, and a right coupling member coupled to a right portion of the upper-right arm member and a right portion of the lower-right arm member, and the right arm mechanism swings upward when the vehicle body frame leans rightward and swings downward when the vehicle body frame leans leftward; and
- a buffer that couples the left arm mechanism and the right arm mechanism and performs a buffering action; wherein the left steerable wheel is supported by the left coupling member; and the right steerable wheel is supported by the right coupling member.

* * * * *